(12) United States Patent
Huang et al.

(10) Patent No.: US 9,201,216 B2
(45) Date of Patent: Dec. 1, 2015

(54) IMAGE CAPTURING LENS ASSEMBLY, IMAGE CAPTURING DEVICE AND MOBILE TERMINAL

(71) Applicant: LARGAN Precision Co., Ltd., Taichung (TW)

(72) Inventors: Hsin-Hsuan Huang, Taichung (TW); Tsung-Han Tsai, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 26 days.

(21) Appl. No.: 14/222,267

(22) Filed: Mar. 21, 2014

(65) Prior Publication Data

US 2015/0212296 A1 Jul. 30, 2015

(30) Foreign Application Priority Data

Jan. 24, 2014 (TW) .............................. 103102649 A

(51) Int. Cl.

| | |
|---|---|
| *G02B 13/04* | (2006.01) |
| *G02B 9/62* | (2006.01) |
| *G02B 13/00* | (2006.01) |
| *G02B 3/04* | (2006.01) |
| *H04N 5/225* | (2006.01) |

(52) U.S. Cl.
CPC .............. *G02B 13/0045* (2013.01); *G02B 3/04* (2013.01); *H04N 5/225* (2013.01)

(58) Field of Classification Search
CPC .............................. G02B 13/0045; G02B 9/62
USPC .......................................................... 359/713
See application file for complete search history.

(56) References Cited

U.S. PATENT DOCUMENTS

| | | | |
|---|---|---|---|
| 8,687,292 B2 * | 4/2014 | Tsai et al. ..................... 359/761 |
| 2015/0022905 A1 | 1/2015 | Shinohara et al. | |
| 2015/0070578 A1 | 3/2015 | Chen et al. | |
| 2015/0098135 A1 | 4/2015 | Chung et al. | |
| 2015/0116572 A1 | 4/2015 | Liao | |

(Continued)

FOREIGN PATENT DOCUMENTS

| | | |
|---|---|---|
| JP | 2014010399 | 1/2014 |
| JP | 2014010400 | 1/2014 |
| JP | 2014010401 | 1/2014 |
| TW | 201243386 | 11/2012 |
| WO | 2014013676 A1 | 1/2014 |
| WO | 2014013677 A1 | 1/2014 |

OTHER PUBLICATIONS

Intellectual Property Office, Ministry of Economic Affairs, R.O.C., "Office Action", Nov. 17, 2014, Taiwan.

*Primary Examiner* — David N Spector
(74) *Attorney, Agent, or Firm* — Locke Lord LLP; Tim Tingkang Xia, Esq.

(57) ABSTRACT

An image capturing lens assembly includes, in order from an object side to an image side, a first lens element, a second lens element, a third lens element, a fourth lens element, a fifth lens element, and a sixth lens element. The first lens element with negative refractive power has an object-side surface being convex in a paraxial region thereof and an image-side surface being concave in a paraxial region thereof. The second lens element has positive refractive power. The third lens element has refractive power. The fourth lens element has refractive power. The fifth lens element has negative refractive power, wherein both of the surfaces thereof are aspheric. The sixth lens element with refractive power has an image-side surface being concave in a paraxial region thereof. The image capturing lens assembly has a total of six lens elements with refractive power.

25 Claims, 21 Drawing Sheets

(56) References Cited

U.S. PATENT DOCUMENTS

| | | |
|---|---|---|
| 2015/0116573 A1 | 4/2015 | Liao |
| 2015/0124332 A1 | 5/2015 | Noda et al. |
| 2015/0124333 A1 | 5/2015 | Noda et al. |
| 2015/0177482 A1 | 6/2015 | Bone et al. |
| 2015/0177484 A1 | 6/2015 | Hsu et al. |
| 2015/0177485 A1 | 6/2015 | Hsu et al. |

* cited by examiner

IMAGE CAPTURING LENS ASSEMBLY, IMAGE CAPTURING DEVICE AND MOBILE TERMINAL

RELATED APPLICATIONS

This application claims priority to Taiwan Application Serial Number 103102649, filed Jan. 24, 2014, which is incorporated by reference herein in its entirety.

BACKGROUND

1. Technical Field

The present disclosure relates to an image capturing lens assembly, an image capturing device and a mobile terminal. More particularly, the present disclosure relates to a compact image capturing lens assembly and an image capturing device applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the field of view is not large enough to capture big image scene and the back focal length is not reduced; therefore, the total track length of the optical system is too long. It is also thereby not favorable for keeping the optical system compact.

SUMMARY

According to one aspect of the present disclosure, an image capturing lens assembly includes, in order from an object side to an image side, a first lens element, a second lens element, a third lens element, a fourth lens element, a fifth lens element, and a sixth lens element. The first lens element with negative refractive power has an object-side surface being convex in a paraxial region thereof and an image-side surface being concave in a paraxial region thereof. The second lens element has positive refractive power. The third lens element has refractive power. The fourth lens element has refractive power. The fifth lens element has negative refractive power, wherein both of an object-side surface and an image-side surface of the fifth lens element are aspheric. The sixth lens element with refractive power has an image-side surface being concave in a paraxial region thereof, wherein an object-side surface and the image-side surface of the sixth lens element are aspheric, and at least one of the object-side surface and the image-side surface of the sixth lens element has at least one inflection point. The image capturing lens assembly has a total of six lens elements with refractive power. When a focal length of the image capturing lens assembly is f, a focal length of the first lens element is f1, a focal length of the second lens element is f2, and a focal length of the fifth lens element is f5, the following conditions are satisfied:

$-1.0 < f2/f1 < 0$; and $-1.5 < f/f5 < 0$.

According to another aspect of the present disclosure, an image capturing lens assembly includes, in order from an object side to an image side, a first lens element, a second lens element, a third lens element, a fourth lens element, a fifth lens element, and a sixth lens element. The first lens element has negative refractive power. The second lens element has positive refractive power. The third lens element has refractive power. The fourth lens element has refractive power, wherein both of an object-side surface and an image-side surface of the fourth lens element are aspheric. The fifth lens element has refractive power, wherein both of an object-side surface and an image-side surface of the fifth lens element are aspheric. The sixth lens element with refractive power has an image-side surface being concave in a paraxial region thereof, wherein an object-side surface and the image-side surface of the sixth lens element are aspheric, and at least one of the object-side surface and the image-side surface of the sixth lens element has at least one inflection point. The image capturing lens assembly has a total of six lens elements with refractive power. When a focal length of the image capturing lens assembly is f, a focal length of the first lens element is f1, a focal length of the second lens element is f2, a focal length of the fifth lens element is f5, and an axial distance between an object-side surface of the first lens element and an image plane is TL, and an entrance pupil diameter of the image capturing lens assembly is EPD, the following conditions are satisfied:

$-3.0 < f2/f1 < 0$;

$-1.5 < f/f5 < 0.4$; and $TL/EPD < 5.0$.

According to still another aspect of the present disclosure, an image capturing device includes the image capturing lens assembly according to the aforementioned aspect and an image sensor, wherein the image sensor is located on the image side of the image capturing lens assembly.

According to yet another aspect of the present disclosure, a mobile terminal includes the image capturing device according to the foregoing aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
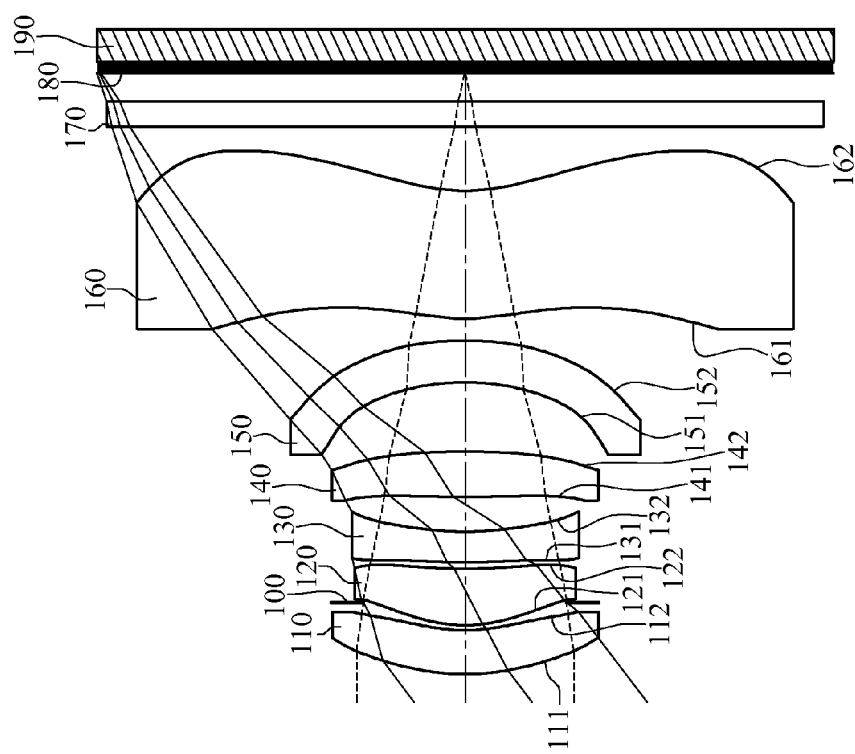
FIG. 1 is a schematic view of an image capturing device according to the 1st embodiment of the present disclosure.

An image capturing lens assembly includes, in order from an object side to an image side, a first lens element, a second lens element, a third lens element, a fourth lens element, a fifth lens element, and a sixth lens element. The image capturing lens assembly has a total of six lens elements with refractive power.

The first lens element has negative refractive power, so that it is favorable for enlarging the field of view so as to capture more of the image scene. The first lens element has an object-side surface being convex in a paraxial region thereof and an image-side surface being concave in a paraxial region thereof, so that the refractive variance of the incident light will be relatively minimized by reducing the angle of the incident light. It is also favorable for correcting the astigmatism of the image capturing lens assembly.

The second lens element has positive refractive power, so that it is favorable for having light convergence ability. The second lens element can have an object-side surface being convex in a paraxial region thereof; therefore, it is favorable for reinforcing the light convergence ability of the second lens element.

The third lens element can have negative refractive power, so that it is favorable for correcting the aberration of the image capturing lens assembly. The third lens element can have an image-side surface being concave in a paraxial region thereof, so that it is favorable for the principal point of the image capturing lens assembly being positioned away from an image plane so as to reduce the total track length thereof and maintain a compact size thereof.

The fourth lens element can have positive refractive power, so that it is favorable for reducing the photosensitivity of the image capturing lens assembly.

The fifth lens element can have negative refractive power, so that it is favorable for correcting the Petzval Sum of the image capturing lens assembly so as to improve the flatness of the image plane. The fifth lens element can have an object-side surface being concave in a paraxial region thereof, so that it is favorable for properly adjusting the negative refractive power of the fifth lens element.

The sixth lens element with refractive power can have an object-side surface being convex in a paraxial region thereof and an image-side surface being concave in a paraxial region thereof, so that the principal point of the image capturing lens assembly can be positioned away from the image plane so as to reduce the total track length thereof. Furthermore, at least one of the object-side surface and the image-side surface of the sixth lens element can have at least one inflection point. Therefore, it is favorable for reducing the incident angle of the off-axis on the image plane so as to correct the aberration of the off-axis.

When a focal length of the first lens element is f1, and a focal length of the second lens element is f2, the following condition is satisfied: $-3.0 < f2/f1 < 0$. Therefore, it is favorable for reducing the spherical aberration. Preferably, the following condition is satisfied: $-1.0 < f2/f1 < 0$. More preferably, the following condition is satisfied: $-0.6 < f2/f1 < 0$.

When a focal length of the image capturing lens assembly is f, and a focal length of the fifth lens element is f5, the following condition is satisfied: $-1.5 < f/f5 < 0.4$. Therefore, it is favorable for correcting the aberration. Preferably, the following condition is satisfied: $-1.5 < f/f5 < 0$. More preferably, the following condition is satisfied: $-0.85 < f/f5 < 0$.

When an axial distance between the object-side surface of the first lens element and the image plane is TL, and an entrance pupil diameter of the image capturing lens assembly is EPD, the following condition is satisfied: $TL/EPD < 5.0$. Therefore, it is favorable for increasing the light exposure of the image capturing lens assembly and maintaining a compact size thereof. Preferably, the following condition is satisfied: $TL/EPD < 4.0$.

In the present disclosure, the aforementioned image capturing lens assembly can further include a stop, such as an aperture stop, wherein an axial distance between the stop and the image plane is SL, and an axial distance between the object-side surface of the first lens element and the image plane is TL, the following condition is satisfied: $0.80 < SL/TL < 1.10$. Therefore, it is favorable for reducing the total track length of the image capturing lens assembly so as to maintain a compact size thereof.

When the focal length of the image capturing lens assembly is f, and a focal length of the sixth lens element is f6, the following condition is satisfied: $-0.5 < f/f6 < 0.5$. Therefore, it is favorable for the principal point of the image capturing lens assembly being positioned away from the image plane by adjusting the back focal length of the image capturing lens assembly so as to reduce the total track length thereof.

When a central thickness of the fourth lens element is CT4, and a central thickness of the sixth lens element is CT6, the following condition is satisfied: $1.0<CT6/CT4<4.0$. Therefore, the central thicknesses of the fourth and the sixth lens elements will be more proper. Therefore, it is favorable for the assembly and space arrangement of the image capturing lens assembly.

When the axial distance between the object-side surface of the first lens element and the image plane is TL, and a maximum image height of the image capturing lens assembly (half of a diagonal length of an effective photosensitive area of an image sensor) is ImgH, the following condition is satisfied: $TL/ImgH<1.90$. Therefore, it is favorable for maintaining a compact size thereof so as to be applied to portable mobile terminals.

In the present disclosure, of the first lens element, the second lens element, the third lens element, the fourth lens element, the fifth lens element and the sixth lens element of the image capturing lens assembly, there is a space in a paraxial region between every pair of lens elements that are adjacent to each other. Therefore, it is favorable for assembling the aspheric lens elements and reducing the assembly difficulties.

When a curvature radius of the object-side surface of the sixth lens element is R11, and a curvature radius of the image-side surface of the sixth lens element is R12, the following condition is satisfied: $-0.2<(R11-R12)/(R11+R12)<0.4$. Therefore, the principal point of the image capturing lens assembly can be positioned away from the image plane, so that it is favorable for reducing the total track length to maintain a compact size thereof.

When an axial distance between the fourth lens element and the fifth lens element is T45, and an axial distance between the fifth lens element and the sixth lens element is T56, the following condition is satisfied: $0<T56/T45<0.90$. Therefore, it is favorable for assembling the lens elements so as to increase manufacturing yield rate.

When an Abbe number of the second lens element is V2, the following condition is satisfied: $40<V2<70$. Therefore, it is favorable for correcting the chromatic aberration of the image capturing lens assembly.

When an axial distance between the second lens element and the third lens element is T23, and an axial distance between the third lens element and the fourth lens element is T34, the following condition is satisfied: $0<T23/T34<0.50$. Therefore, it is favorable for assembling the lens elements by properly adjusting the axial distances between the aforementioned lens elements so as to reduce the total track length. It is thereby favorable for keeping the size compact to be applied to portable mobile terminals.

When a curvature radius of an object-side surface of the fourth lens element is R7, and a curvature radius of an image-side surface of the fourth lens element is R8, the following condition is satisfied: $-0.5<(R7+R8)/(R7-R8)<0.5$. Therefore, it is favorable for correcting the astigmatism.

Figure 19:
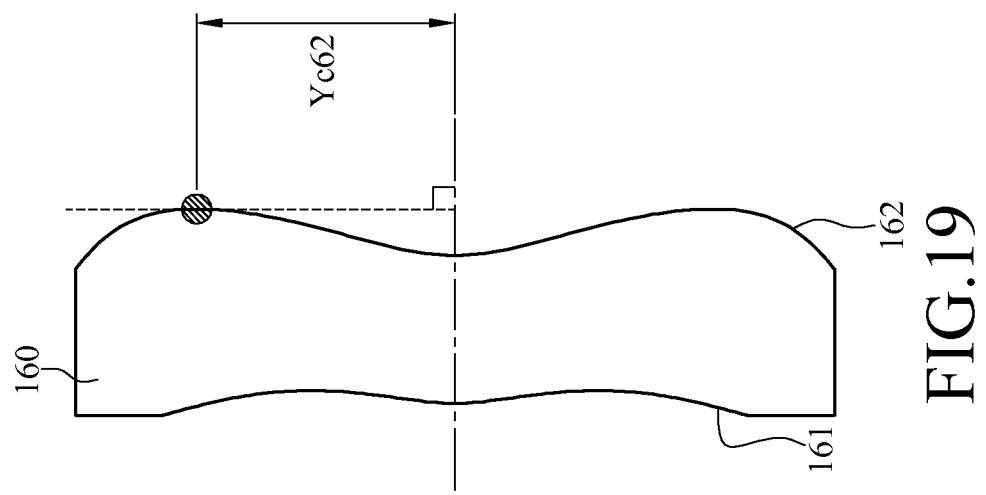
FIG. 19 shows Yc62 according to the image-side surface of the sixth lens element of the FIG. 1.

When a vertical distance between a non-axial critical point on the image-side surface of the sixth lens element and an optical axis is Yc62, and the axial distance between the object-side surface of the first lens element and the image plane is TL, the following condition is satisfied: $0.1<Yc62/TL<0.7$. Therefore, it is favorable for effectively correcting the aberration of the off-axis and reducing the total track length of the image capturing lens assembly so as to keep a compact size thereof. Particularly, FIG. 19 shows Yc62 according to the image-side surface of the sixth lens element of the FIG. 1. The critical point on the image-side surface of the sixth lens element is a non-axial point of the lens surface where its tangent is perpendicular to an optical axis.

According to the image capturing lens assembly of the present disclosure, the lens elements thereof can be made of glass or plastic material. When the lens elements are made of glass material, the distribution of the refractive power of the image capturing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing lens assembly of the present disclosure, a critical point is a non-axial point of the lens surface where its tangent is perpendicular to an optical axis.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, an aperture stop can be configured as a front stop or a middle stop. A front stop disposed between an imaged object and the first lens element can provide a longer distance between an exit pupil of the image capturing lens assembly and the image plane and thereby improves the image-sensing efficiency of an image sensor. A middle stop disposed between the first lens element and the image plane is favorable for enlarging the field of view of the image capturing lens assembly and thereby provides a wider field of view for the same.

According to the image capturing lens assembly of the present disclosure, the image capturing lens assembly can be optionally applied to moving focus optical systems. Furthermore, the image capturing lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the aforementioned image capturing lens assembly according to the present disclosure and an image sensor, wherein the image sensor is disposed on or near the image plane of the image capturing lens assembly. Preferably, the image capturing device can further include a barrel member, a holding member or a combination thereof.

Figure 21:
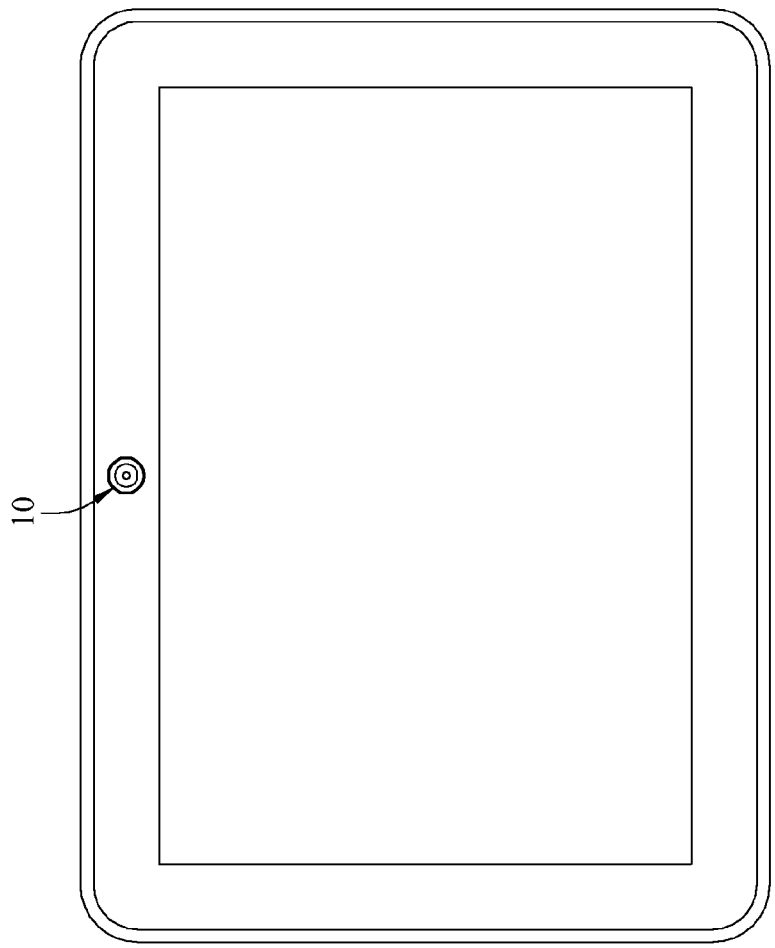
FIG. 21 shows a mobile terminal according to the 2nd embodiment of the present disclosure.
Figure 20:
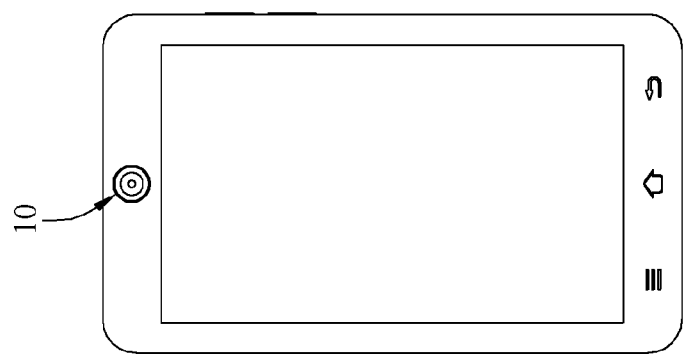
FIG. 20 shows a mobile terminal according to the 1st embodiment of the present disclosure.
Figure 22:
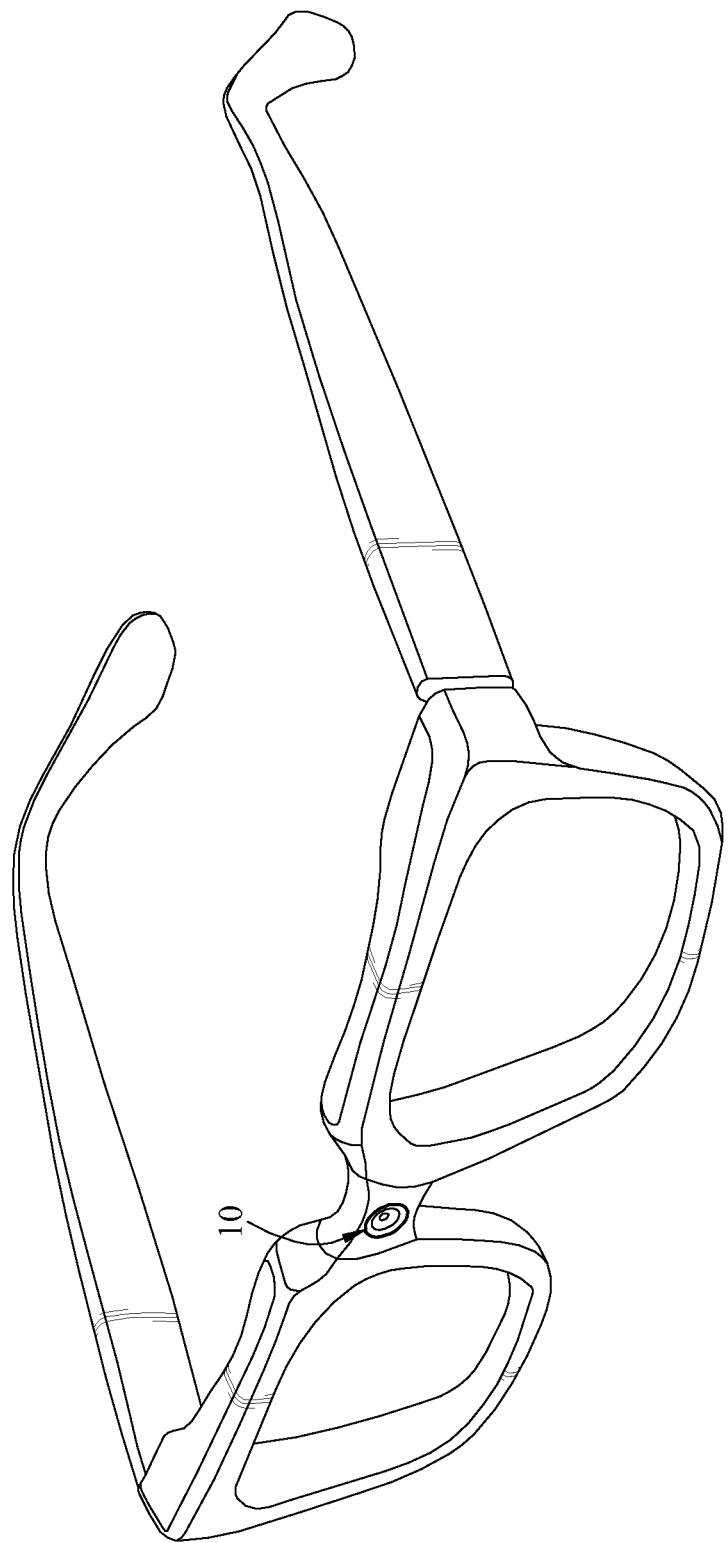
FIG. 22 shows a mobile terminal according to the 3rd embodiment of the present disclosure.

In FIG. 20, FIG. 21 and FIG. 22, an image capturing device 10 may be installed in, but not limited to, a mobile terminal, including a smart phone (FIG. 20), a tablet personal computer (FIG. 21) or a wearable device (FIG. 22). The three exemplary figures of different kinds of mobile terminal are only exemplary for showing the image capturing device of present disclosure installing in a mobile terminal and is not limited thereto. In some embodiments, the mobile terminal can further include, but not limited to, a display, a control unit, a random access memory unit (RAM), a read only memory unit (ROM) or a combination thereof.

According to the above description of the present disclosure, the following specific embodiments are provided for further explanation.

1st Embodiment

Figure 2:
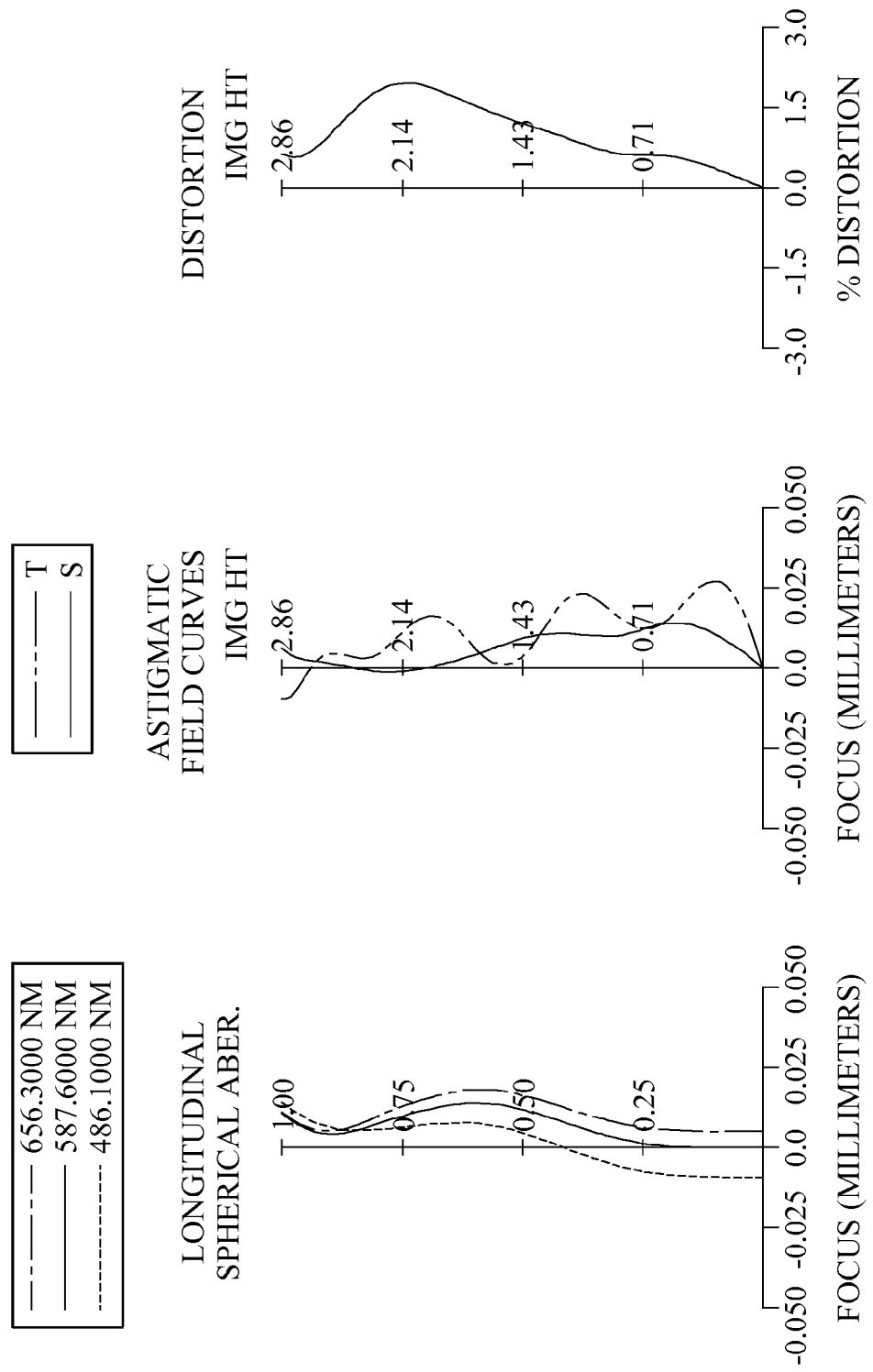
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the image capturing lens assembly (not otherwise herein labeled) of the present disclosure and an image sensor 190. The image capturing lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image plane 180, wherein the image capturing lens assembly has a total of six lens elements (110-160) with refractive power.

The first lens element 110 with negative refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being convex in a paraxial region thereof and an image-side surface 122 being concave in a paraxial region thereof, which are both aspheric, and the second lens element 120 is made of plastic material.

The third lens element 130 with negative refractive power has an object-side surface 131 being convex in a paraxial region thereof and an image-side surface 132 being concave in a paraxial region thereof, which are both aspheric, and the third lens element 130 is made of plastic material.

The fourth lens element 140 with positive refractive power has an object-side surface 141 being convex in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being concave in a paraxial region thereof and an image-side surface 152 being convex in a paraxial region thereof, which are both aspheric, and the fifth lens element 150 is made of plastic material.

The sixth lens element 160 with positive refractive power has an object-side surface 161 being convex in a paraxial region thereof and an image-side surface 162 being concave in a paraxial region thereof, which are both aspheric, and the sixth lens element 160 is made of plastic material. Specifically, both of the object-side surface 161 and the image-side surface 162 of the sixth lens element 160 have at least one inflection point.

The IR-cut filter 170 is made of glass and located between the sixth lens element 160 and the image plane 180, and will not affect the focal length of the image capturing lens assembly. The image sensor 190 is disposed on or near the image plane 180 of the image capturing lens assembly.

The equation of the aspheric surface profiles of the aforementioned lens elements of the 1st embodiment is expressed as follows:

$$X(Y) = (Y^2/R)/(1 + sqrt(1-(1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens assembly of the image capturing device according to the 1st embodiment, when a focal length of the image capturing lens assembly is f, an f-number of the image capturing lens assembly is Fno, and half of a maximal field of view of the image capturing lens assembly is HFOV, these parameters have the following values: f=3.73 mm; Fno=2.20; and HFOV=37.2 degrees.

In the image capturing lens assembly of the image capturing device according to the 1st embodiment, when an Abbe number of the second lens element 120 is V2, the following condition is satisfied: V2=55.9.

In the image capturing lens assembly of the image capturing device according to the 1st embodiment, a central thickness of the fourth lens element 140 is CT4, and a central thickness of the sixth lens element 160 is CT6, the following condition is satisfied: CT6/CT4=2.82.

In the image capturing lens assembly of the image capturing device according to the 1st embodiment, when an axial distance between the second lens element 120 and the third lens element 130 is T23, and an axial distance between the third lens element 130 and the fourth lens element 140 is T34, the following condition is satisfied: T23/T34=0.18.

In the image capturing lens assembly of the image capturing device according to the 1st embodiment, when an axial distance between the fourth lens element 140 and the fifth lens element 150 is T45, and an axial distance between the fifth lens element 150 and the sixth lens element 160 is T56, the following condition is satisfied: T56/T45=0.32.

In the image capturing lens assembly of the image capturing device according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.36.

In the image capturing lens assembly of the image capturing device according to the 1st embodiment, when a curvature radius of the object-side surface 161 of the sixth lens element 160 is R11, and a curvature radius of the image-side surface 162 of the sixth lens element 160 is R12, the following condition is satisfied: (R11−R12)/(R11+R12)=0.05.

In the image capturing lens assembly of the image capturing device according to the 1st embodiment, when a focal length of the first lens element 110 is f1, and a focal length of the second lens element 120 is f2, the following condition is satisfied: f2/f1=−0.24.

In the image capturing lens assembly of the image capturing device according to the 1st embodiment, when the focal length of the image capturing lens assembly is f, and a focal length of the fifth lens element 150 is f5, the following condition is satisfied: f/f5=−0.53.

In the image capturing lens assembly of the image capturing device according to the 1st embodiment, when the focal length of the image capturing lens assembly is f, and a focal length of the sixth lens element 160 is f6, the following condition is satisfied: f/f6=0.17.

FIG. 19 shows Yc62 according to the image-side surface 162 of the sixth lens element 160 of the FIG. 1. In FIG. 19, when a vertical distance between a non-axial critical point on the image-side surface 162 of the sixth lens element 160 and an optical axis is Yc62, and an axial distance between the object-side surface 111 of the first lens element 110 and the image plane 180 is TL, the following condition is satisfied: Yc62/TL=0.37.

In the image capturing lens assembly of the image capturing device according to the 1st embodiment, when an axial distance between the aperture stop 100 and the image plane 180 is SL, and the axial distance between the object-side surface 111 of the first lens element 110 and the image plane 180 is TL, and the following condition is satisfied: SL/TL=0.88.

In the image capturing lens assembly of the image capturing device according to the 1st embodiment, when the axial distance between the object-side surface 111 of the first lens element 110 and the image plane 180 is TL, and an entrance pupil diameter of the image capturing lens assembly is EPD, the following condition is satisfied: TL/EPD=2.78.

In the image capturing lens assembly of the image capturing device according to the 1st embodiment, when the axial distance between the object-side surface 111 of the first lens element 110 and the image plane 180 is TL, and a maximum image height of the image capturing lens assembly (half of a diagonal length of an effective photosensitive area of an image sensor 190) is ImgH, the following condition is satisfied: TL/ImgH=1.65.

The detailed optical data of the 1st embodiment are shown in Table 1 and the aspheric surface data are shown in Table 2 below.

TABLE 1

1st Embodiment
f = 3.73 mm, Fno = 2.20, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.887 | ASP | 0.343 | Plastic | 1.530 | 55.8 | −10.44 |
| 2 | | 1.318 | ASP | 0.216 | | | | |
| 3 | Ape. Stop | Plano | | −0.177 | | | | |
| 4 | Lens 2 | 1.088 | ASP | 0.443 | Plastic | 1.544 | 55.9 | 2.48 |
| 5 | | 4.854 | ASP | 0.050 | | | | |
| 6 | Lens 3 | 5.099 | ASP | 0.240 | Plastic | 1.640 | 23.3 | −7.54 |
| 7 | | 2.434 | ASP | 0.272 | | | | |
| 8 | Lens 4 | 11.525 | ASP | 0.354 | Plastic | 1.544 | 55.9 | 6.81 |
| 9 | | −5.404 | ASP | 0.541 | | | | |
| 10 | Lens 5 | −1.741 | ASP | 0.325 | Plastic | 1.640 | 23.3 | −6.97 |
| 11 | | −3.063 | ASP | 0.173 | | | | |
| 12 | Lens 6 | 1.608 | ASP | 1.000 | Plastic | 1.544 | 55.9 | 21.83 |
| 13 | | 1.453 | ASP | 0.500 | | | | |
| 14 | IR-cut filter | Plano | | 0.200 | Glass | 1.517 | 64.2 | — |
| 15 | | Plano | | 0.223 | | | | |
| 16 | Image | Plano | | — | | | | |

Note:
Reference wavelength is 587.6 nm (d-line).

TABLE 2

Aspheric Coefficients

| | Surface # | | | | | |
|---|---|---|---|---|---|---|
| | 1 | 2 | 4 | 5 | 6 | 7 |
| k = | −4.2721E−01 | −7.1390E+00 | −4.3409E+00 | 4.6581E+00 | −1.8839E+01 | −1.1488E+01 |
| A4 = | −5.4031E−02 | −1.7315E−01 | −1.3845E−02 | −2.9771E−02 | −2.1825E−01 | −9.9796E−02 |
| A6 = | 5.9177E−02 | 2.8878E−02 | −5.9499E−03 | 1.2998E−01 | 3.5191E−01 | 2.9299E−01 |
| A8 = | −1.0589E−01 | 1.2407E−01 | −7.6694E−02 | −7.9203E−01 | −3.3747E−01 | −5.1716E−01 |
| A10 = | 1.4137E−01 | −2.4389E−02 | 2.0129E−01 | 1.5469E−01 | −4.4605E−01 | 1.1826E+00 |
| A12 = | −9.3821E−02 | −5.1438E−02 | 9.5847E−02 | 1.1399E+00 | 1.4191E+00 | −1.3868E+00 |
| A14 = | 3.4320E−02 | 3.6685E−02 | −1.6624E−01 | −7.9308E−01 | −7.8293E−01 | 6.3741E−01 |

| | Surface # | | | | | |
|---|---|---|---|---|---|---|
| | 8 | 9 | 10 | 11 | 12 | 13 |
| k = | −4.2103E+00 | −9.8252E−01 | −2.3812E−01 | 3.0534E+00 | −2.0000E+01 | −5.8181E+00 |
| A4 = | −3.2154E−02 | 2.3481E−02 | 1.1447E−01 | −3.0654E−01 | −1.1913E−01 | −5.3305E−02 |
| A6 = | −1.7932E−01 | −2.2218E−01 | −4.2201E−01 | 7.6871E−01 | 5.7962E−02 | 1.8193E−02 |
| A8 = | 4.0532E−01 | 4.6796E−01 | 1.1680E+00 | −1.2423E+00 | −1.4355E−02 | −4.6816E−03 |
| A10 = | −5.4477E−01 | −6.9547E−01 | −2.6388E+00 | 1.2329E+00 | 8.3195E−04 | 7.9393E−04 |
| A12 = | 8.5550E−03 | 4.9832E−01 | 3.3900E+00 | −7.3118E−01 | 3.3814E−04 | −8.9826E−05 |

TABLE 2-continued

Aspheric Coefficients

| A14 = | 6.6292E−01 | −1.1544E−01 | −2.3165E+00 | 2.3069E−01 | −6.3671E−05 | 4.4840E−06 |
|---|---|---|---|---|---|---|
| A16 = | −4.2904E−01 | | 6.3539E−01 | −2.8966E−02 | 3.1667E−06 | |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
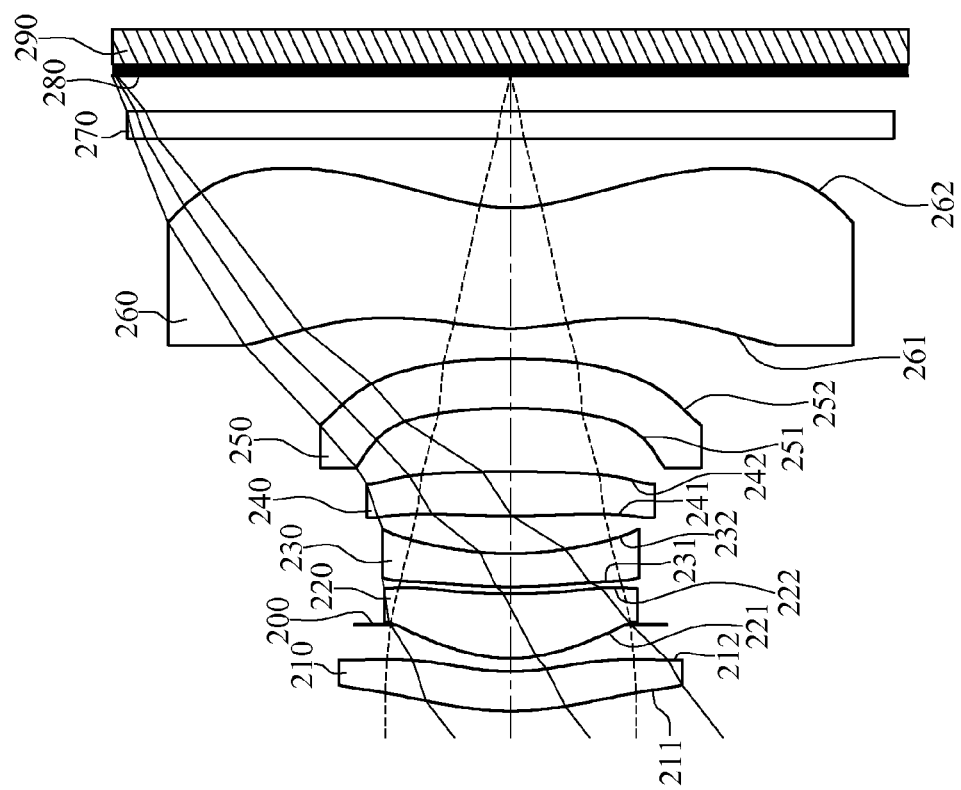
FIG. 3 is a schematic view of an image capturing device according to the 2nd embodiment of the present disclosure.
Figure 4:
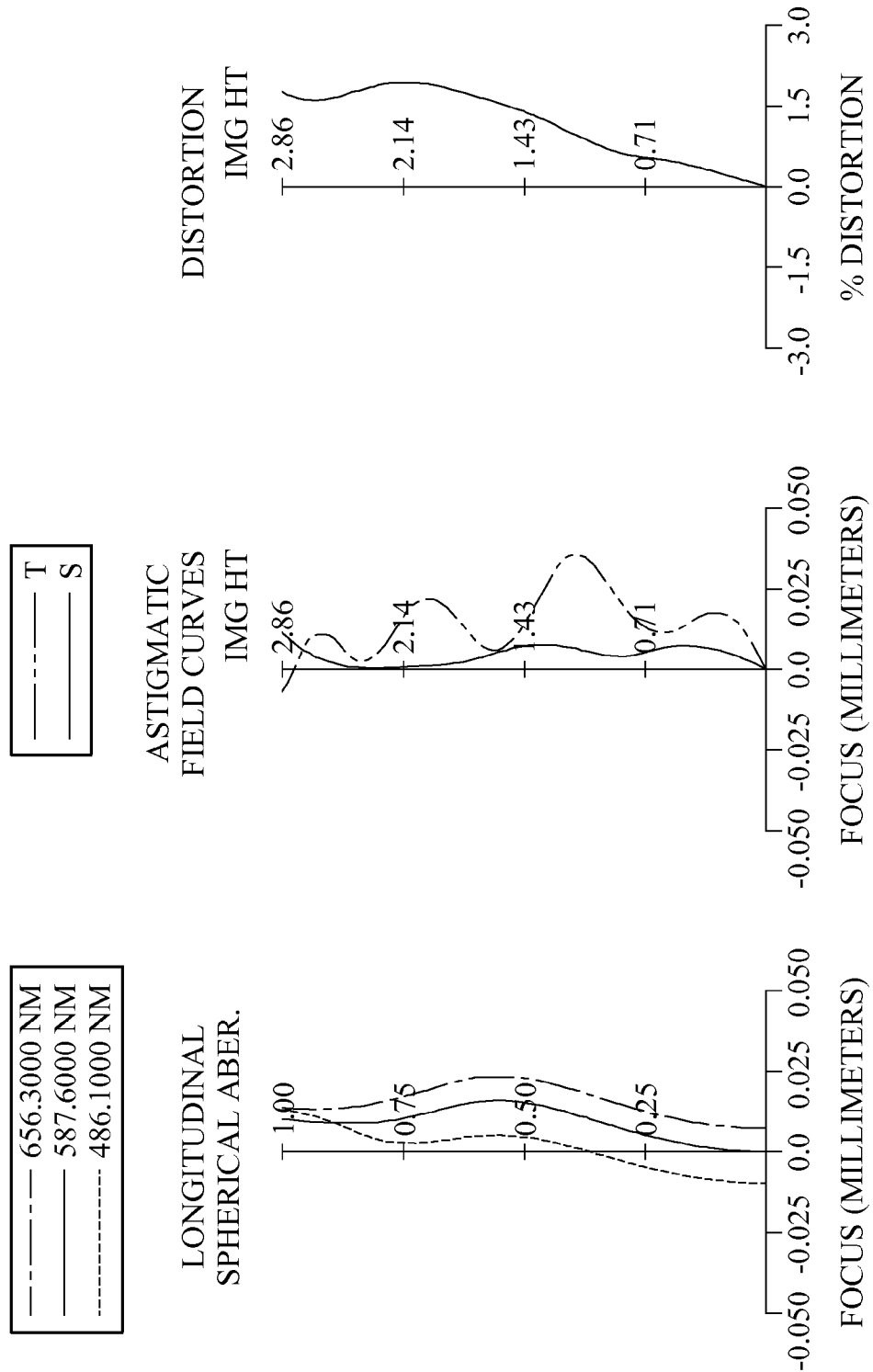
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the image capturing lens assembly (not otherwise herein labeled) of the present disclosure and an image sensor 290. The image capturing lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image plane 280, wherein the image capturing lens assembly has a total of six lens elements (210-260) with refractive power.

The first lens element 210 with negative refractive power has an object-side surface 211 being convex in a paraxial region thereof and an image-side surface 212 being concave in a paraxial region thereof, which are both aspheric, and the first lens element 210 is made of plastic material.

The second lens element 220 with positive refractive power has an object-side surface 221 being convex in a paraxial region thereof and an image-side surface 222 being concave in a paraxial region thereof, which are both aspheric, and the second lens element 220 is made of plastic material.

The third lens element 230 with negative refractive power has an object-side surface 231 being convex in a paraxial region thereof and an image-side surface 232 being concave in a paraxial region thereof, which are both aspheric, and the third lens element 230 is made of plastic material.

The fourth lens element 240 with positive refractive power has an object-side surface 241 being convex in a paraxial region thereof and an image-side surface 242 being convex in a paraxial region thereof, which are both aspheric, and the fourth lens element 240 is made of plastic material.

The fifth lens element 250 with negative refractive power has an object-side surface 251 being concave in a paraxial region thereof and an image-side surface 252 being convex in a paraxial region thereof, which are both aspheric, and the fifth lens element 250 is made of plastic material.

The sixth lens element 260 with negative refractive power has an object-side surface 261 being convex in a paraxial region thereof and an image-side surface 262 being concave in a paraxial region thereof, which are both aspheric, and the sixth lens element 260 is made of plastic material. Specifically, both of the object-side surface 261 and the image-side surface 262 of the sixth lens element 260 have at least one inflection point.

The IR-cut filter 270 is made of glass and located between the sixth lens element 260 and the image plane 280, and will not affect the focal length of the image capturing lens assembly. The image sensor 290 is disposed on or near the image plane 280 of the image capturing lens assembly.

The detailed optical data of the 2nd embodiment are shown in Table 3 and the aspheric surface data are shown in Table 4 below.

TABLE 3

2nd Embodiment
f = 3.63 mm, Fno = 2.00, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.148 | ASP | 0.287 | Plastic | 1.544 | 55.9 | −15.84 |
| 2 | | 1.639 | ASP | 0.340 | | | | |
| 3 | Ape. Stop | Plano | | −0.245 | | | | |
| 4 | Lens 2 | 1.192 | ASP | 0.468 | Plastic | 1.544 | 55.9 | 2.70 |
| 5 | | 5.425 | ASP | 0.050 | | | | |
| 6 | Lens 3 | 4.115 | ASP | 0.240 | Plastic | 1.650 | 21.4 | −8.09 |
| 7 | | 2.255 | ASP | 0.274 | | | | |
| 8 | Lens 4 | 7.921 | ASP | 0.319 | Plastic | 1.544 | 55.9 | 9.63 |
| 9 | | −15.241 | ASP | 0.460 | | | | |
| 10 | Lens 5 | −3.291 | ASP | 0.358 | Plastic | 1.650 | 21.4 | −14.13 |
| 11 | | −5.351 | ASP | 0.219 | | | | |
| 12 | Lens 6 | 1.687 | ASP | 0.875 | Plastic | 1.535 | 55.7 | −307.39 |
| 13 | | 1.368 | ASP | 0.500 | | | | |
| 14 | IR-cut filter | Plano | | 0.200 | Glass | 1.517 | 64.2 | — |
| 15 | | Plano | | 0.255 | | | | |
| 16 | Image | Plano | | — | | | | |

Note:
Reference wavelength is 587.6 nm (d-line).

TABLE 4

Aspheric Coefficients

| Surface # | | | | | |
|---|---|---|---|---|---|
| 1 | 2 | 4 | 5 | 6 | 7 |
| k = | −5.6980E+00 | −7.8065E+00 | −3.5250E+00 | 5.0000E+00 | 5.0000E+00 | −7.3303E+00 |
| A4 = | −5.4730E−02 | −1.7616E−01 | 5.0297E−02 | 4.4225E−02 | −1.6348E−01 | −9.3348E−02 |
| A6 = | 5.1021E−02 | −1.5742E−02 | −3.8843E−02 | 1.4640E−01 | 3.1091E−01 | 3.0035E−01 |
| A8 = | −1.2823E−01 | 1.0233E−01 | −5.4938E−02 | −7.0729E−01 | −4.1720E−01 | −6.1920E−01 |
| A10 = | 1.4424E−01 | −5.5386E−03 | 1.3055E−01 | 9.0580E−04 | −3.9810E−01 | 1.1232E+00 |
| A12 = | −7.3729E−02 | −5.2000E−02 | −1.0549E−01 | 1.0475E+00 | 1.2511E+00 | −1.0794E+00 |
| A14 = | 1.5148E−02 | 2.2203E−02 | 7.3346E−03 | −6.0565E−01 | −6.2335E−01 | 4.2552E−01 |

| Surface # | | | | | |
|---|---|---|---|---|---|
| 8 | 9 | 10 | 11 | 12 | 13 |
| k = | −9.1403E+00 | −3.0046E+00 | 2.4239E+00 | 5.0000E+00 | −2.0000E+01 | −5.8540E+00 |
| A4 = | −4.9791E−02 | 9.5233E−03 | 6.7444E−02 | −2.7326E−01 | −1.2770E−01 | −6.1824E−02 |
| A6 = | −1.3533E−01 | −2.4610E−01 | −2.9814E−01 | 7.2487E−01 | 5.5233E−02 | 2.1945E−02 |
| A8 = | 3.0860E−01 | 4.7776E−01 | 9.5903E−01 | −1.2251E+00 | −1.3470E−02 | −6.2072E−03 |
| A10 = | −4.0466E−01 | −6.7492E−01 | −2.4990E+00 | 1.2145E+00 | 1.1303E−03 | 1.0966E−03 |
| A12 = | 2.3961E−02 | 4.9211E−01 | 3.3620E+00 | −7.2531E−01 | 3.0150E−04 | −1.1725E−04 |
| A14 = | 4.8765E−01 | −1.1429E−01 | −2.3376E+00 | 2.3476E−01 | −8.0164E−05 | 5.4524E−06 |
| A16 = | −3.2062E−01 | | 6.4736E−01 | −3.0836E−02 | 5.4761E−06 | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.63 | (R11 − R12)/(R11 + R12) | 0.10 |
| Fno | 2.00 | f2/f1 | −0.17 |
| HFOV [deg.] | 37.7 | f/f5 | −0.26 |
| V2 | 55.9 | f/f6 | −0.01 |
| CT6/CT4 | 2.74 | Yc62/TL | 0.35 |
| T23/T34 | 0.18 | SL/TL | 0.86 |
| T56/T45 | 0.48 | TL/EPD | 2.54 |
| (R7 + R8)/(R7 − R8) | −0.32 | TL/ImgH | 1.61 |

3rd Embodiment

Figure 5:
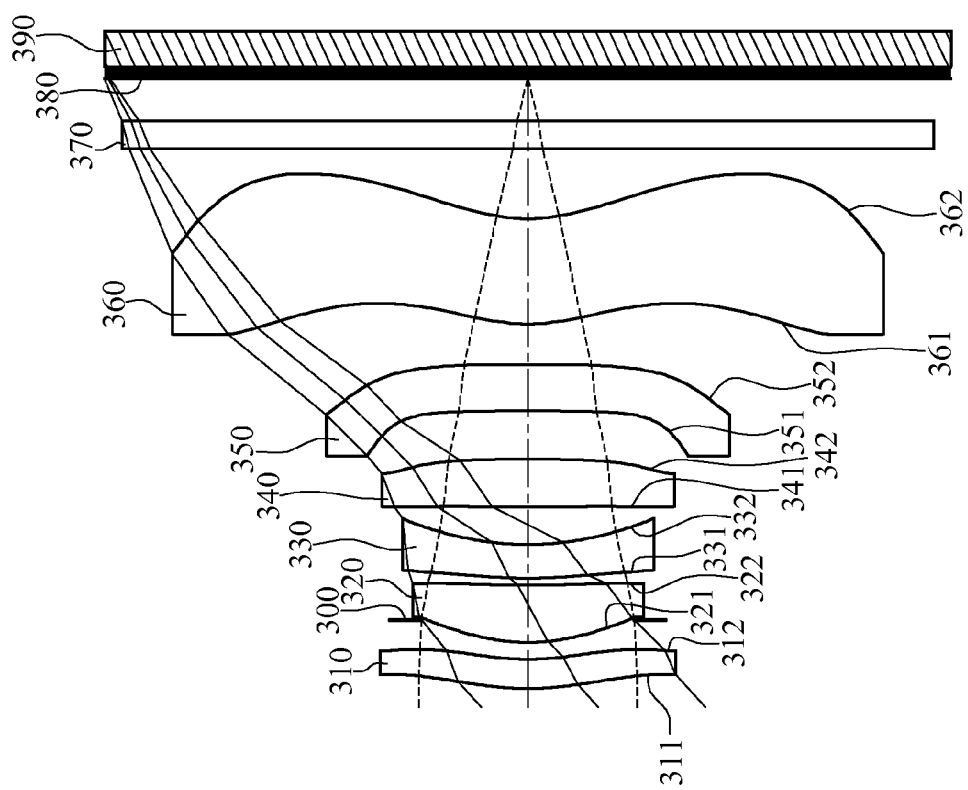
FIG. 5 is a schematic view of an image capturing device according to the 3rd embodiment of the present disclosure.
Figure 6:
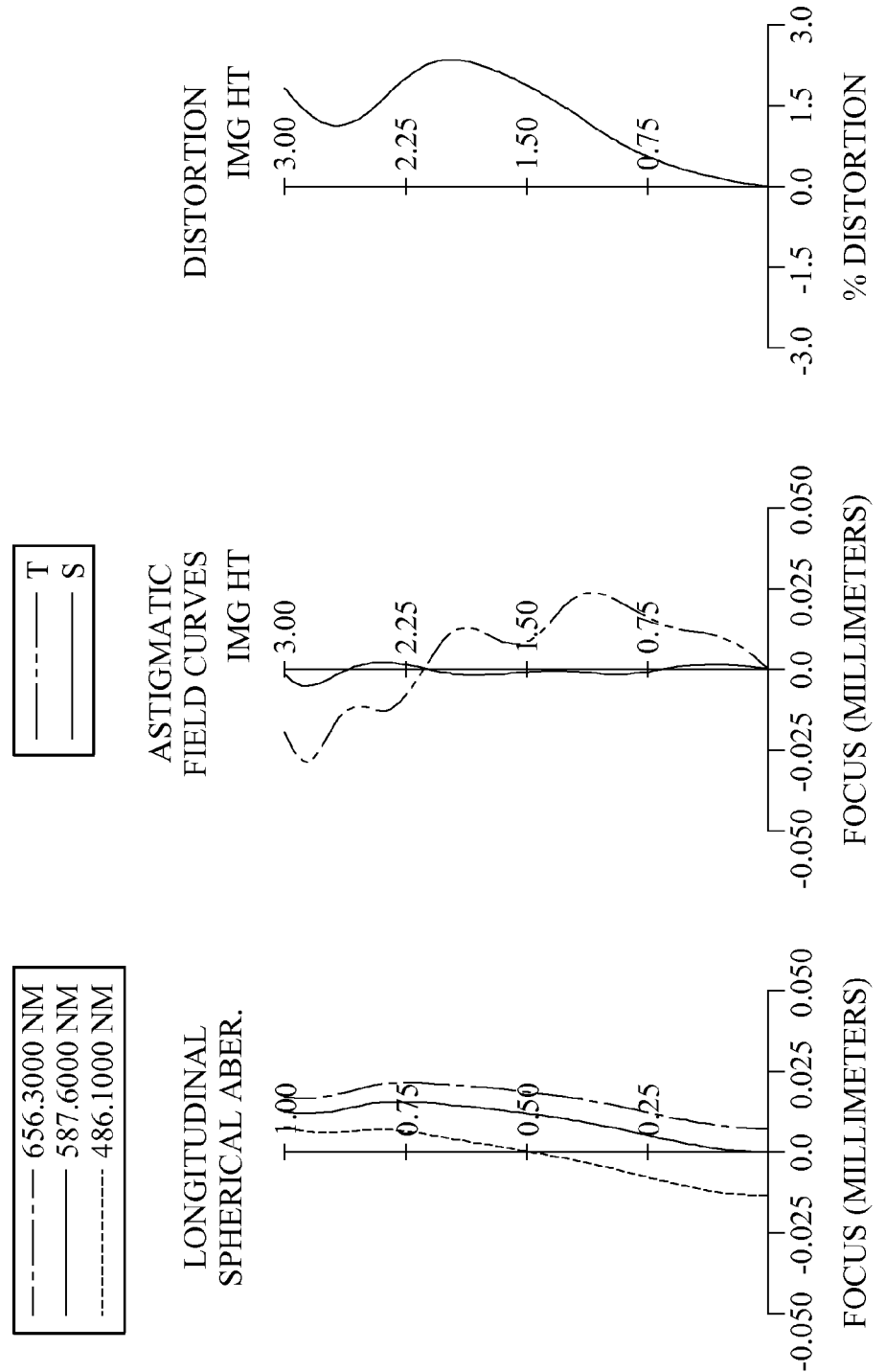
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the image capturing lens assembly (not otherwise herein labeled) of the present disclosure and an image sensor 390. The image capturing lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image plane 380, wherein the image capturing lens assembly has a total of six lens elements (310-360) with refractive power.

The first lens element 310 with negative refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being convex in a paraxial region thereof and an image-side surface 322 being concave in a paraxial region thereof, which are both aspheric, and the second lens element 320 is made of plastic material.

The third lens element 330 with negative refractive power has an object-side surface 331 being convex in a paraxial region thereof and an image-side surface 332 being concave in a paraxial region thereof, which are both aspheric, and the third lens element 330 is made of plastic material.

The fourth lens element 340 with positive refractive power has an object-side surface 341 being convex in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being concave in a paraxial region thereof and an image-side surface 352 being concave in a paraxial region thereof, which are both aspheric, and the fifth lens element 350 is made of plastic material.

The sixth lens element 360 with positive refractive power has an object-side surface 361 being convex in a paraxial region thereof and an image-side surface 362 being concave in a paraxial region thereof, which are both aspheric, and the sixth lens element 360 is made of plastic material. Specifically, both of the object-side surface 361 and the image-side surface 362 of the sixth lens element 360 have at least one inflection point.

The IR-cut filter 370 is made of glass and located between the sixth lens element 360 and the image plane 380, and will not affect the focal length of the image capturing lens assembly. The image sensor 390 is disposed on or near the image plane 380 of the image capturing lens assembly.

The detailed optical data of the 3rd embodiment are shown in Table 5 and the aspheric surface data are shown in Table 6 below.

TABLE 5

3rd Embodiment
f = 3.27 mm, Fno = 2.10, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.152 | ASP | 0.209 | Plastic | 1.572 | 56.0 | −31.82 |
| 2 | | 1.856 | ASP | 0.281 | | | | |
| 3 | Ape. Stop | Plano | | −0.160 | | | | |
| 4 | Lens 2 | 1.452 | ASP | 0.409 | Plastic | 1.572 | 56.0 | 2.95 |
| 5 | | 9.347 | ASP | 0.050 | | | | |
| 6 | Lens 3 | 3.497 | ASP | 0.240 | Plastic | 1.639 | 23.5 | −8.02 |
| 7 | | 2.023 | ASP | 0.268 | | | | |
| 8 | Lens 4 | 14.953 | ASP | 0.343 | Plastic | 1.572 | 56.0 | 14.65 |
| 9 | | −18.904 | ASP | 0.346 | | | | |
| 10 | Lens 5 | −19.928 | ASP | 0.331 | Plastic | 1.639 | 23.5 | −18.38 |
| 11 | | 28.794 | ASP | 0.289 | | | | |
| 12 | Lens 6 | 1.298 | ASP | 0.753 | Plastic | 1.572 | 56.0 | 13.29 |
| 13 | | 1.235 | ASP | 0.500 | | | | |
| 14 | IR-cut filter | Plano | | 0.200 | Glass | 1.517 | 64.2 | — |
| 15 | | Plano | | 0.304 | | | | |
| 16 | Image | Plano | | — | | | | |

Note:
Reference wavelength is 587.6 nm (d-line).

TABLE 6

Aspheric Coefficients

| | Surface # | | | | | |
|---|---|---|---|---|---|---|
| | 1 | 2 | 4 | 5 | 6 | 7 |
| k = | −7.7292E+00 | −9.9551E+00 | −5.0357E+00 | −1.3728E+01 | −1.4498E+01 | −2.9779E+00 |
| A4 = | −8.1254E−02 | −1.6583E−01 | 6.4047E−02 | −5.3279E−02 | −1.3309E−01 | −6.7139E−02 |
| A6 = | 2.7219E−02 | −1.0793E−02 | −5.6911E−02 | 9.7348E−02 | 2.1723E−01 | 2.3577E−01 |
| A8 = | −8.4889E−02 | 7.8378E−02 | −2.6696E−02 | −3.0086E−01 | −3.2578E−01 | −4.5202E−01 |
| A10 = | 9.6244E−02 | −1.3394E−02 | 1.1972E−01 | −2.7441E−01 | −8.7000E−02 | 6.1902E−01 |
| A12 = | −4.9565E−02 | −3.6561E−02 | −9.3354E−02 | 6.2678E−01 | 7.2863E−01 | −5.1298E−01 |
| A14 = | 1.1378E−02 | 2.0470E−02 | 2.4259E−02 | −3.5996E−01 | −4.1022E−01 | 1.9546E−01 |

| | Surface # | | | | | |
|---|---|---|---|---|---|---|
| | 8 | 9 | 10 | 11 | 12 | 13 |
| k = | 2.8389E+00 | −2.0000E+01 | 5.0000E+00 | −2.0000E+01 | −7.5428E+00 | −4.4514E+00 |
| A4 = | −6.9742E−02 | −5.1967E−02 | 1.6131E−02 | −2.8769E−01 | −1.3168E−01 | −7.1558E−02 |
| A6 = | 4.8713E−03 | −1.6778E−01 | −2.0282E−01 | 6.1536E−01 | 4.7565E−02 | 2.2757E−02 |
| A8 = | 8.5464E−02 | 3.2940E−01 | 5.8772E−01 | −8.9972E−01 | −9.8489E−03 | −5.3898E−03 |
| A10 = | −1.3054E−01 | −4.2136E−01 | −1.4957E+00 | 7.7875E−01 | 6.7892E−04 | 7.6087E−04 |
| A12 = | 7.9621E−02 | 2.9004E−01 | 1.9048E+00 | −4.1674E−01 | 1.8011E−04 | −7.3262E−05 |
| A14 = | 9.1185E−02 | −5.3573E−02 | −1.2511E+00 | 1.2505E−01 | −3.9509E−05 | 3.6035E−06 |
| A16 = | −9.7056E−02 | | 3.2724E−01 | −1.5650E−02 | 2.2158E−06 | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.27 | (R11 − R12)/(R11 + R12) | 0.02 |
| Fno | 2.10 | f2/f1 | −0.09 |

-continued

| 3rd Embodiment | | | |
|---|---|---|---|
| HFOV [deg.] | 42.0 | f/f5 | −0.18 |
| V2 | 56.0 | f/f6 | 0.25 |
| CT6/CT4 | 2.20 | Yc62/TL | 0.36 |
| T23/T34 | 0.19 | SL/TL | 0.89 |
| T56/T45 | 0.84 | TL/EPD | 2.81 |
| (R7 + R8)/(R7 − R8) | −0.12 | TL/ImgH | 1.45 |

4th Embodiment

Figure 7:
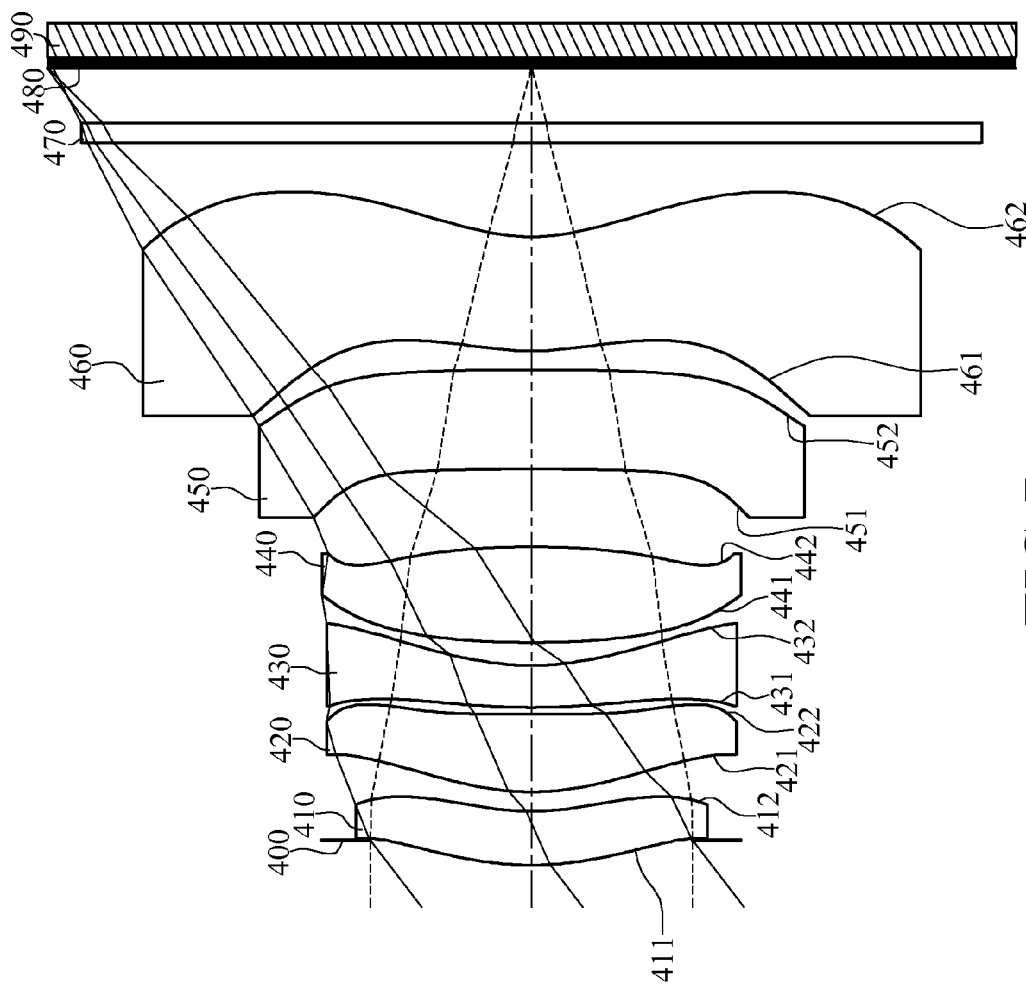
FIG. 7 is a schematic view of an image capturing device according to the 4th embodiment of the present disclosure.
Figure 8:
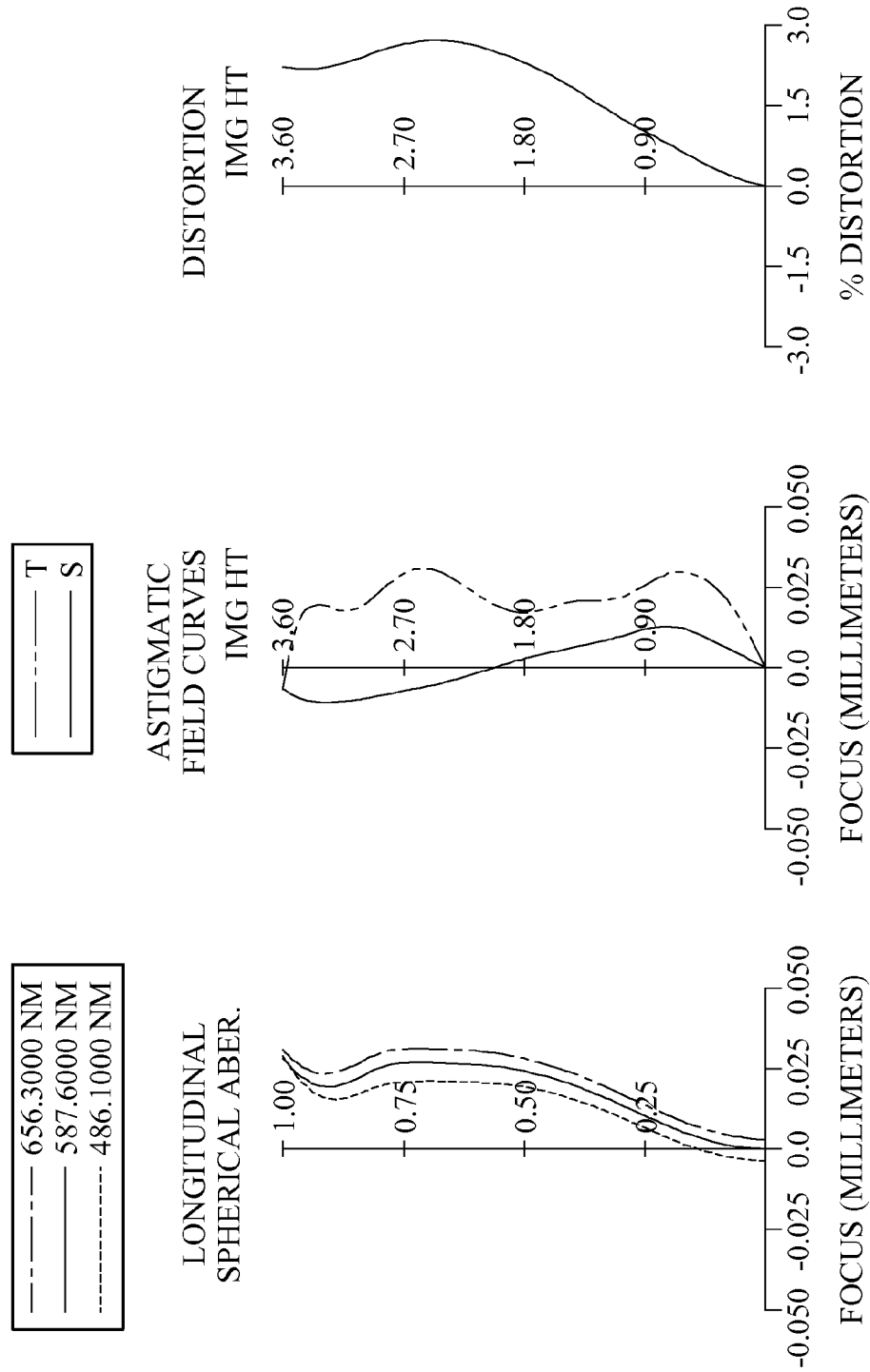
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the image capturing lens assembly (not otherwise herein labeled) of the present disclosure and an image sensor 490. The image capturing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image plane 480, wherein the image capturing lens assembly has a total of six lens elements (410-460) with refractive power.

The first lens element 410 with negative refractive power has an object-side surface 411 being convex in a paraxial region thereof and an image-side surface 412 being concave in a paraxial region thereof, which are both aspheric, and the first lens element 410 is made of plastic material.

The second lens element 420 with positive refractive power has an object-side surface 421 being convex in a paraxial region thereof and an image-side surface 422 being convex in a paraxial region thereof, which are both aspheric, and the second lens element 420 is made of plastic material.

The third lens element 430 with negative refractive power has an object-side surface 431 being convex in a paraxial region thereof and an image-side surface 432 being concave in a paraxial region thereof, which are both aspheric, and the third lens element 430 is made of plastic material.

The fourth lens element 440 with positive refractive power has an object-side surface 441 being convex in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being concave in a paraxial region thereof and an image-side surface 452 being convex in a paraxial region thereof, which are both aspheric, and the fifth lens element 450 is made of plastic material.

The sixth lens element 460 with negative refractive power has an object-side surface 461 being convex in a paraxial region thereof and an image-side surface 462 being concave in a paraxial region thereof, which are both aspheric, and the sixth lens element 460 is made of plastic material. Specifically, both of the object-side surface 461 and the image-side surface 462 of the sixth lens element 460 have at least one inflection point.

The IR-cut filter 470 is made of glass and located between the sixth lens element 460 and the image plane 480, and will not affect the focal length of the image capturing lens assembly. The image sensor 490 is disposed on or near the image plane 480 of the image capturing lens assembly.

The detailed optical data of the 4th embodiment are shown in Table 7 and the aspheric surface data are shown in Table 8 below.

TABLE 7

4th Embodiment
f = 4.55 mm, Fno = 1.90, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.185 | | | | |
| 2 | Lens 1 | 2.368 | ASP | 0.401 | Plastic | 1.560 | 56.0 | −71.22 |
| 3 | | 2.100 | ASP | 0.144 | | | | |
| 4 | Lens 2 | 1.989 | ASP | 0.579 | Plastic | 1.535 | 55.7 | 3.68 |
| 5 | | −163.526 | ASP | 0.050 | | | | |
| 6 | Lens 3 | 5.290 | ASP | 0.312 | Plastic | 1.639 | 23.5 | −5.67 |
| 7 | | 2.101 | ASP | 0.172 | | | | |
| 8 | Lens 4 | 7.684 | ASP | 0.712 | Plastic | 1.535 | 55.7 | 6.36 |
| 9 | | −5.915 | ASP | 0.580 | | | | |
| 10 | Lens 5 | −15.858 | ASP | 0.738 | Plastic | 1.639 | 23.5 | −36.93 |
| 11 | | −49.231 | ASP | 0.139 | | | | |
| 12 | Lens 6 | 2.148 | ASP | 0.850 | Plastic | 1.535 | 55.7 | −15.79 |
| 13 | | 1.476 | ASP | 0.700 | | | | |
| 14 | IR-cut filter | Plano | | 0.150 | Glass | 1.517 | 64.2 | — |
| 15 | | Plano | | 0.404 | | | | |
| 16 | Image | Plano | | — | | | | |

Note:
Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | −2.9886E+00 | −4.8206E+00 | −4.2970E+00 | −2.6710E+00 | −1.9984E+01 | −4.6660E+00 |
| A4 = | −2.3095E−02 | −7.7276E−02 | 8.7409E−04 | 6.7928E−02 | −3.2817E−02 | −2.7111E−02 |
| A6 = | −1.9804E−03 | −2.8578E−02 | −2.2610E−02 | 1.2522E−02 | 3.7923E−02 | 4.0992E−02 |
| A8 = | −2.6898E−03 | 1.0075E−02 | −5.2309E−03 | −2.5227E−02 | −2.8382E−02 | −4.5463E−02 |
| A10 = | −5.2324E−04 | 8.4634E−03 | 6.8344E−03 | −7.8041E−03 | −6.3503E−03 | 2.2046E−02 |
| A12 = | −1.4406E−03 | −7.2517E−03 | 1.0510E−03 | 8.7892E−03 | 1.0622E−02 | −4.8462E−03 |
| A14 = | 5.7495E−04 | 1.6673E−03 | −1.0142E−03 | −1.9027E−03 | −2.4150E−03 | 3.6709E−04 |

TABLE 8-continued

Aspheric Coefficients

| Surface # | | | | | |
|---|---|---|---|---|---|
| 8 | 9 | 10 | 11 | 12 | 13 |
| k = −8.0101E−01 | 2.8574E+00 | −9.7133E+00 | 1.5488E+00 | −1.5306E+01 | −4.8589E+00 |
| A4 = 1.8137E−02 | −4.1161E−03 | 4.2202E−02 | −4.7263E−02 | −9.0507E−02 | −4.6497E−02 |
| A6 = 4.1092E−03 | −2.2113E−02 | −7.3603E−02 | 7.1289E−02 | 1.7675E−02 | 1.0020E−02 |
| A8 = 5.5748E−03 | 2.6087E−02 | 6.4176E−02 | −6.4313E−02 | −2.8586E−03 | −1.5213E−03 |
| A10 = −5.1634E−03 | −1.4231E−02 | −5.8871E−02 | 2.9507E−02 | 2.6984E−05 | 1.2498E−04 |
| A12 = 1.2072E−03 | 6.1527E−03 | 3.3981E−02 | −7.6788E−03 | 4.3984E−05 | −4.6066E−06 |
| A14 = 4.9311E−04 | −7.9443E−04 | −1.0582E−02 | 1.0697E−03 | 4.9484E−06 | 2.0601E−08 |
| A16 = −1.8370E−04 | | 1.3382E−03 | −6.0943E−05 | −9.2829E−07 | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.55 | (R11 − R12)/(R11 + R12) | 0.19 |
| Fno | 1.90 | f2/f1 | −0.05 |
| HFOV [deg.] | 37.6 | f/f5 | −0.12 |
| V2 | 55.7 | f/f6 | −0.29 |
| CT6/CT4 | 1.19 | Yc62/TL | 0.30 |
| T23/T34 | 0.29 | SL/TL | 0.97 |
| T56/T45 | 0.24 | TL/EPD | 2.48 |
| (R7 + R8)/(R7 − R8) | 0.13 | TL/ImgH | 1.65 |

5th Embodiment

Figure 9:
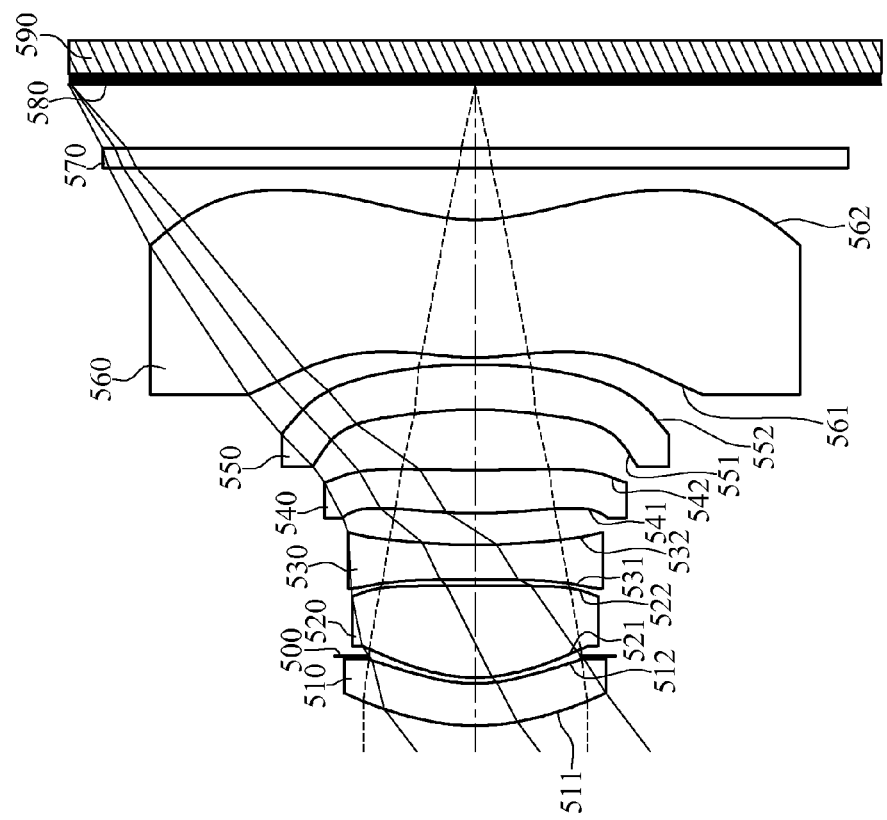
FIG. 9 is a schematic view of an image capturing device according to the 5th embodiment of the present disclosure.
Figure 10:
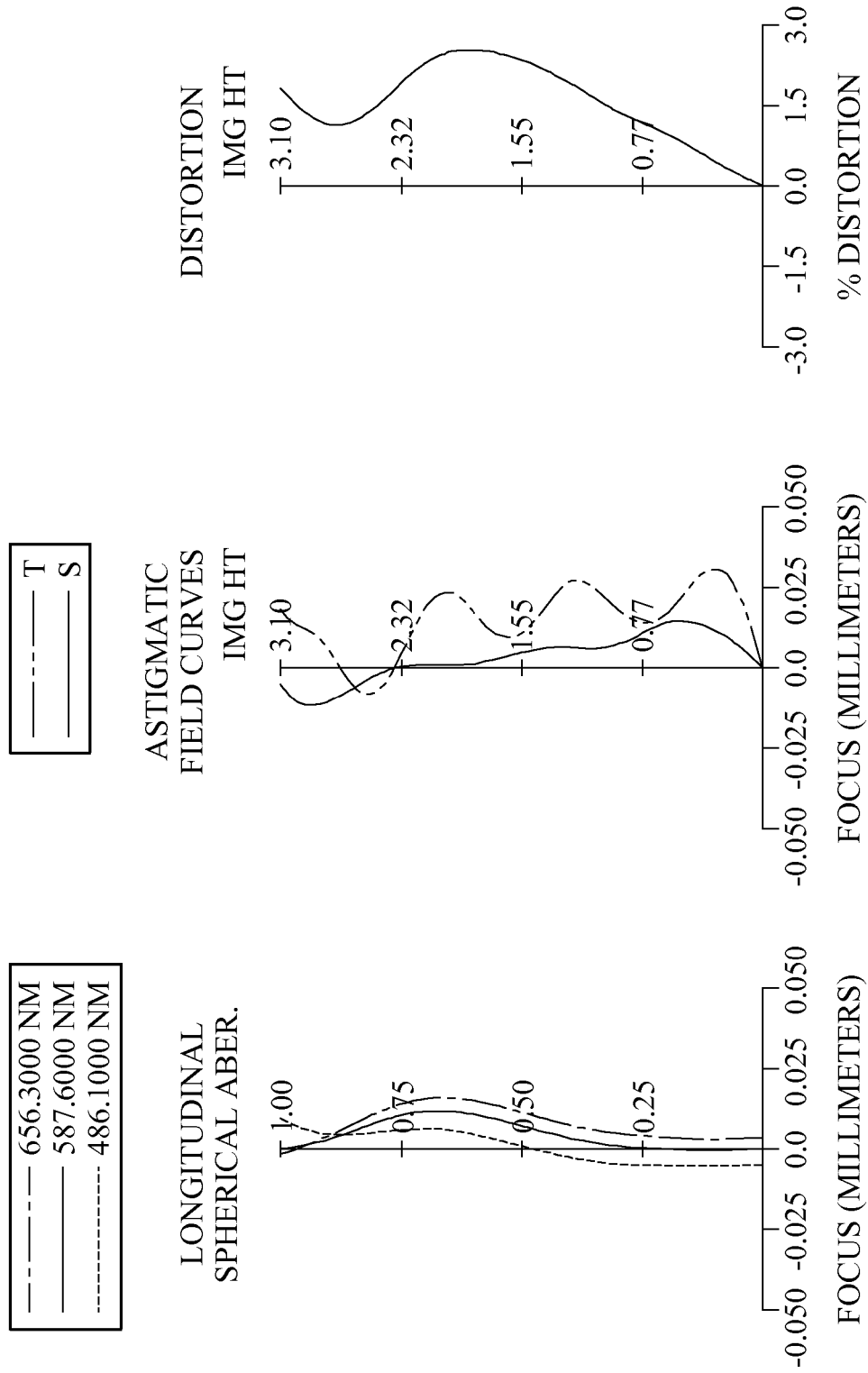
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the image capturing lens assembly (not otherwise herein labeled) of the present disclosure and an image sensor 590. The image capturing lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image plane 580, wherein the image capturing lens assembly has a total of six lens elements (510-560) with refractive power.

The first lens element 510 with negative refractive power has an object-side surface 511 being convex in a paraxial region thereof and an image-side surface 512 being concave in a paraxial region thereof, which are both aspheric, and the first lens element 510 is made of plastic material.

The second lens element 520 with positive refractive power has an object-side surface 521 being convex in a paraxial region thereof and an image-side surface 522 being convex in a paraxial region thereof, which are both aspheric, and the second lens element 520 is made of plastic material.

The third lens element 530 with negative refractive power has an object-side surface 531 being concave in a paraxial region thereof and an image-side surface 532 being concave in a paraxial region thereof, which are both aspheric, and the third lens element 530 is made of plastic material.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic material.

The fifth lens element 550 with negative refractive power has an object-side surface 551 being concave in a paraxial region thereof and an image-side surface 552 being convex in a paraxial region thereof, which are both aspheric, and the fifth lens element 550 is made of plastic material.

The sixth lens element 560 with positive refractive power has an object-side surface 561 being convex in a paraxial region thereof and an image-side surface 562 being concave in a paraxial region thereof, which are both aspheric, and the sixth lens element 560 is made of plastic material. Specifically, both of the object-side surface 561 and the image-side surface 562 of the sixth lens element 560 have at least one inflection point.

The IR-cut filter 570 is made of glass and located between the sixth lens element 560 and the image plane 580, and will not affect the focal length of the image capturing lens assembly. The image sensor 590 is disposed on or near the image plane 580 of the image capturing lens assembly.

The detailed optical data of the 5th embodiment are shown in Table 9 and the aspheric surface data are shown in Table 10 below.

TABLE 9

5th Embodiment
f = 3.95 mm, Fno = 2.30, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.815 | ASP | 0.324 | Plastic | 1.544 | 55.9 | −11.27 |
| 2 | | 1.312 | ASP | 0.210 | | | | |
| 3 | Ape. Stop | Plano | | −0.165 | | | | |
| 4 | Lens 2 | 1.279 | ASP | 0.705 | Plastic | 1.544 | 55.9 | 2.32 |

TABLE 9-continued

5th Embodiment
f = 3.95 mm, Fno = 2.30, HFOV = 37.5 deg.

| Surface # | | Curvature Radius | Thickness | Material | Index | Abbe # | Focal Length |
|---|---|---|---|---|---|---|---|
| 5 | | −83.333 | ASP | 0.050 | | | |
| 6 | Lens 3 | −14.034 | ASP | 0.265 | Plastic | 1.640 | 23.3 | −5.70 |
| 7 | | 4.961 | ASP | 0.243 | | | |
| 8 | Lens 4 | 4.246 | ASP | 0.331 | Plastic | 1.544 | 55.9 | 9.98 |
| 9 | | 18.925 | ASP | 0.463 | | | |
| 10 | Lens 5 | −2.627 | ASP | 0.346 | Plastic | 1.640 | 23.3 | −11.86 |
| 11 | | −4.226 | ASP | 0.054 | | | |
| 12 | Lens 6 | 2.019 | ASP | 1.057 | Plastic | 1.544 | 55.9 | 175.83 |
| 13 | | 1.682 | ASP | 0.400 | | | |
| 14 | IR-cut filter | Plano | | 0.149 | Glass | 1.517 | 64.2 | — |
| 15 | | Plano | | 0.488 | | | |
| 16 | Image | Plano | | — | | | |

Note:
Reference wavelength is 587.6 nm (d-line).

TABLE 10

Aspheric Coefficients

| Surface # | | | | | |
|---|---|---|---|---|---|
| 1 | 2 | 4 | 5 | 6 | 7 |
| k = | −7.1338E−01 | −3.4978E+00 | −2.2081E+00 | 2.0000E+01 | −9.0000E+01 | −5.9492E+01 |
| A4 = | −4.5615E−02 | −6.0221E−02 | −4.0713E−02 | −1.1204E−02 | −4.6098E−02 | −3.2625E−03 |
| A6 = | 3.1747E−02 | −2.1672E−02 | 3.2269E−02 | 7.5034E−02 | 6.7000E−02 | 9.5013E−02 |
| A8 = | −5.8733E−02 | 3.5288E−02 | −1.5851E−02 | −4.5518E−01 | −2.0294E−01 | −3.3364E−01 |
| A10 = | 6.3122E−02 | −1.3977E−02 | −3.3801E−02 | 1.5169E−01 | −2.3419E−01 | 6.5015E−01 |
| A12 = | −3.4201E−02 | −4.6957E−03 | 6.0074E−02 | 3.2030E−01 | 6.9624E−01 | −5.8346E−01 |
| A14 = | 6.6850E−03 | −3.0303E−03 | −6.8581E−02 | −1.9028E−01 | −3.1813E−01 | 2.0805E−01 |

| Surface # | | | | | |
|---|---|---|---|---|---|
| 8 | 9 | 10 | 11 | 12 | 13 |
| k = | 1.4497E+01 | −5.0000E+01 | −3.3211E+01 | −1.0000E+00 | −3.5748E+01 | −5.4766E+00 |
| A4 = | −7.2181E−02 | 2.5804E−02 | 8.2418E−02 | −1.3986E−01 | −1.4883E−01 | −6.9004E−02 |
| A6 = | −2.0760E−01 | −2.3297E−01 | −3.0554E−01 | 4.2997E−01 | 4.6717E−02 | 2.2272E−02 |
| A8 = | 4.5730E−01 | 3.6894E−01 | 7.1652E−01 | −6.8791E−01 | −7.9686E−03 | −5.0533E−03 |
| A10 = | −5.5080E−01 | −3.7628E−01 | −1.3350E+00 | 5.9808E−01 | 4.8304E−04 | 5.2868E−04 |
| A12 = | −6.6592E−02 | 1.6139E−01 | 1.4017E+00 | −2.9889E−01 | 1.9893E−04 | −1.6539E−05 |
| A14 = | 5.4050E−01 | −1.4838E−02 | −7.7077E−01 | 7.7503E−02 | −1.0067E−05 | −4.2936E−07 |
| A16 = | −2.9813E−01 | | 1.6782E−01 | −7.8904E−03 | −5.8574E−06 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.95 | (R11 − R12)/(R11 + R12) | 0.09 |
| Fno | 2.30 | f2/f1 | −0.21 |
| HFOV [deg.] | 37.5 | f/f5 | −0.33 |
| V2 | 55.9 | f/f6 | 0.02 |
| CT6/CT4 | 3.19 | Yc62/TL | 0.30 |
| T23/T34 | 0.21 | SL/TL | 0.89 |
| T56/T45 | 0.12 | TL/EPD | 2.86 |
| (R7 + R8)/(R7 − R8) | −1.58 | TL/ImgH | 1.59 |

6th Embodiment

Figure 11:
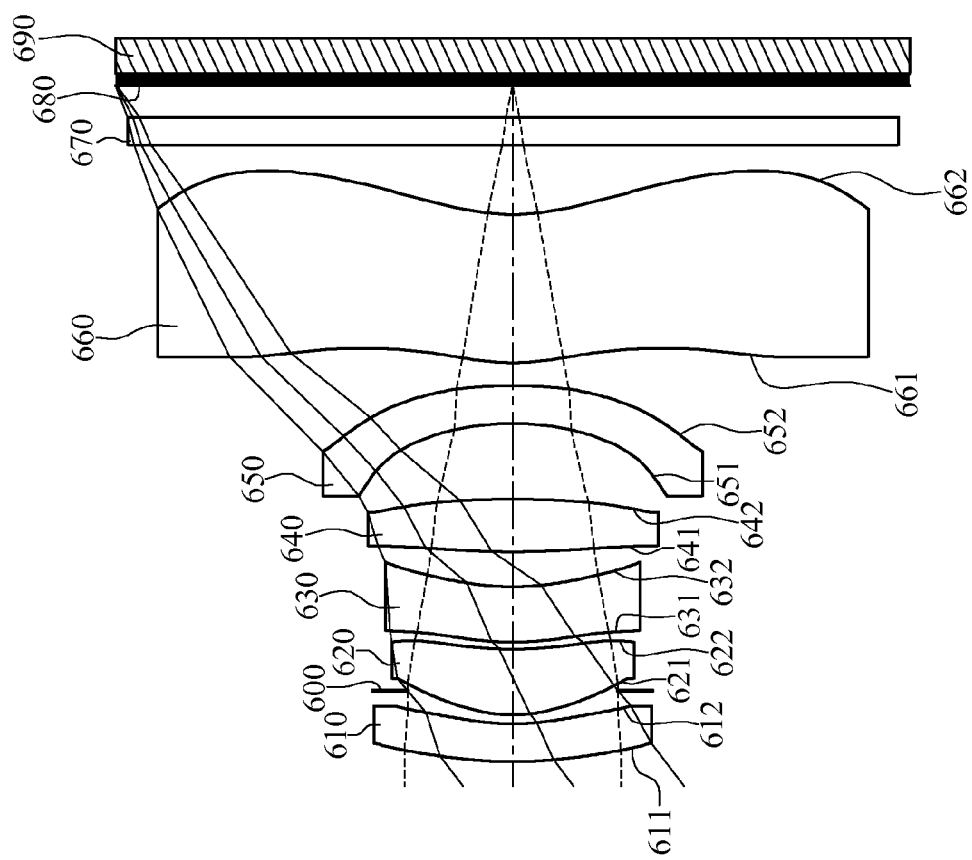
FIG. 11 is a schematic view of an image capturing device according to the 6th embodiment of the present disclosure.
Figure 12:
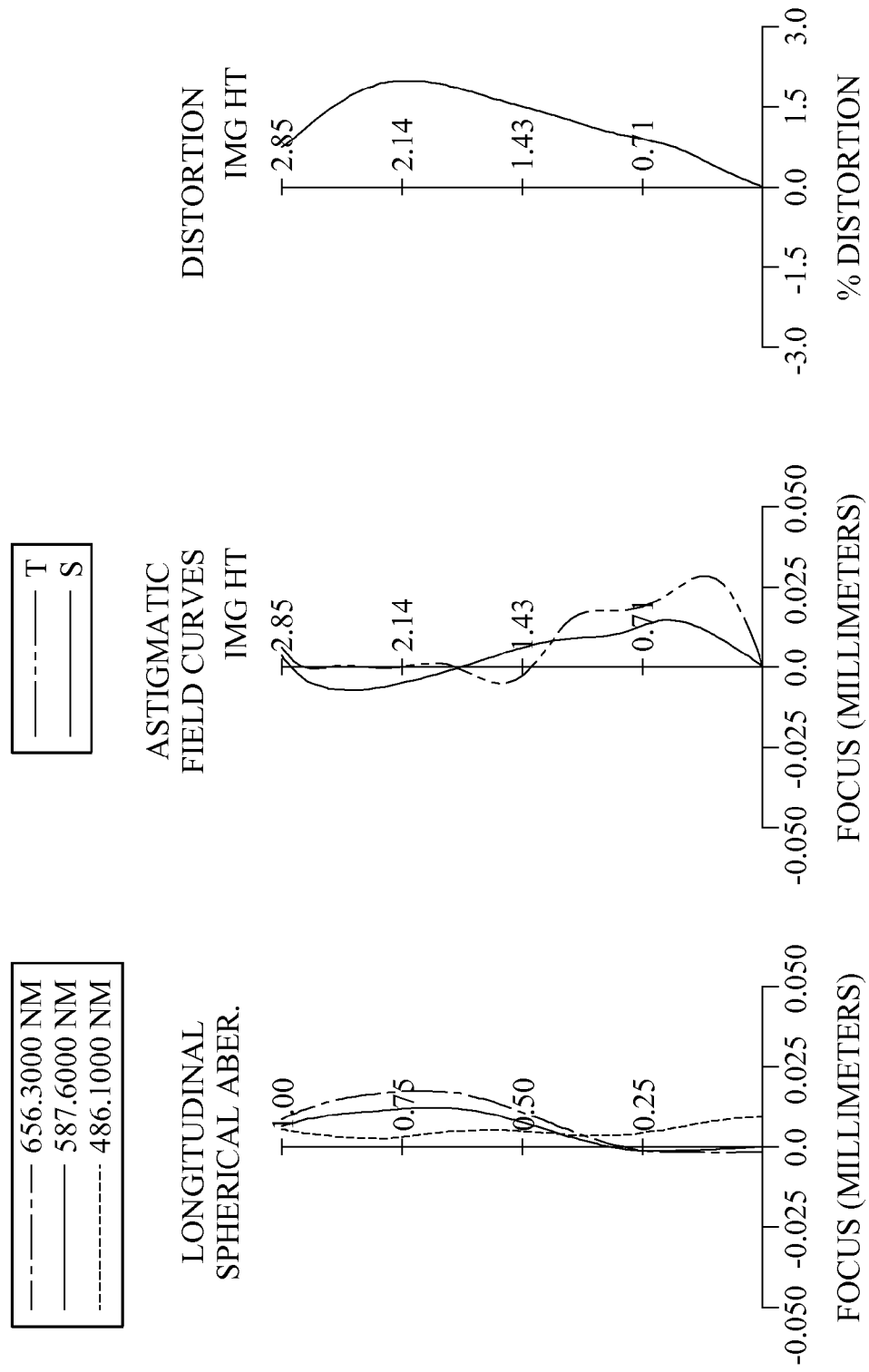
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the image capturing lens assembly (not otherwise herein labeled) of the present disclosure and an image sensor 690. The image capturing lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image plane 680, wherein the image capturing lens assembly has a total of six lens elements (610-660) with refractive power.

The first lens element 610 with negative refractive power has an object-side surface 611 being convex in a paraxial region thereof and an image-side surface 612 being concave in a paraxial region thereof, which are both aspheric, and the first lens element 610 is made of plastic material.

The second lens element 620 with positive refractive power has an object-side surface 621 being convex in a paraxial region thereof and an image-side surface 622 being concave in a paraxial region thereof, which are both aspheric, and the second lens element 620 is made of plastic material.

The third lens element 630 with positive refractive power has an object-side surface 631 being convex in a paraxial region thereof and an image-side surface 632 being concave in a paraxial region thereof, which are both aspheric, and the third lens element 630 is made of plastic material.

The fourth lens element 640 with positive refractive power has an object-side surface 641 being convex in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being concave in a paraxial region thereof and an image-side surface 652 being convex in a paraxial region thereof, which are both aspheric, and the fifth lens element 650 is made of plastic material.

The sixth lens element 660 with positive refractive power has an object-side surface 661 being convex in a paraxial region thereof and an image-side surface 662 being concave in a paraxial region thereof, which are both aspheric, and the sixth lens element 660 is made of plastic material. Specifically, both of the object-side surface 661 and the image-side surface 662 of the sixth lens element 660 have at least one inflection point.

The IR-cut filter 670 is made of glass and located between the sixth lens element 660 and the image plane 680, and will not affect the focal length of the image capturing lens assembly. The image sensor 690 is disposed on or near the image plane 680 of the image capturing lens assembly.

The detailed optical data of the 6th embodiment are shown in Table 11 and the aspheric surface data are shown in Table 12 below.

TABLE 11

6th Embodiment
f = 3.73 mm, Fno = 2.40, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.041 | ASP | 0.273 | Plastic | 1.640 | 23.3 | −5.96 |
| 2 | | 1.632 | ASP | 0.239 | | | | |
| 3 | Ape. Stop | Plano | | −0.174 | | | | |
| 4 | Lens 2 | 1.081 | ASP | 0.474 | Plastic | 1.535 | 55.7 | 3.04 |
| 5 | | 2.726 | ASP | 0.050 | | | | |
| 6 | Lens 3 | 2.020 | ASP | 0.400 | Plastic | 1.632 | 23.4 | 108.90 |
| 7 | | 1.921 | ASP | 0.252 | | | | |
| 8 | Lens 4 | 5.957 | ASP | 0.379 | Plastic | 1.544 | 55.9 | 5.60 |
| 9 | | −6.107 | ASP | 0.546 | | | | |
| 10 | Lens 5 | −1.779 | ASP | 0.272 | Plastic | 1.650 | 21.4 | −5.00 |
| 11 | | −4.174 | ASP | 0.165 | | | | |
| 12 | Lens 6 | 1.515 | ASP | 1.070 | Plastic | 1.535 | 55.7 | 9.72 |
| 13 | | 1.611 | ASP | 0.500 | | | | |
| 14 | IR-cut filter | Plano | | 0.200 | Glass | 1.517 | 64.2 | — |
| 15 | | Plano | | 0.231 | | | | |
| 16 | Image | Plano | | — | | | | |

Note:
Reference wavelength is 587.6 nm (d-line).

TABLE 12

Aspheric Coefficients

| | Surface # | | | | | |
|---|---|---|---|---|---|---|
| | 1 | 2 | 4 | 5 | 6 | 7 |
| k = | −8.5733E+00 | −1.2959E+01 | −5.1208E+00 | −2.0000E+01 | −3.7615E+00 | −2.7572E+00 |
| A4 = | −5.3391E−02 | −7.3823E−02 | 1.3551E−01 | 5.4066E−04 | −2.2298E−01 | −1.2587E−01 |
| A6 = | 8.3785E−02 | −2.4247E−03 | −8.8183E−02 | 1.3646E−01 | 3.0813E−01 | 2.3947E−01 |
| A8 = | −1.1239E−01 | 8.9841E−02 | −5.6468E−02 | −6.4369E−01 | −4.5769E−01 | −5.9659E−01 |
| A10 = | 1.3521E−01 | 2.3533E−03 | 2.2453E−01 | −6.2114E−02 | −3.2513E−01 | 1.0884E+00 |
| A12 = | −7.5429E−02 | −3.5548E−02 | −2.6740E−01 | 1.0639E+00 | 1.2084E+00 | −9.2818E−01 |
| A14 = | 1.6677E−02 | 1.5358E−02 | 1.1107E−01 | −6.0303E−01 | −6.2875E−01 | 3.0669E−01 |

| | Surface # | | | | | |
|---|---|---|---|---|---|---|
| | 8 | 9 | 10 | 11 | 12 | 13 |
| k = | −2.0000E+01 | 3.8988E+00 | 9.7761E−01 | −2.6874E−01 | −1.6618E+01 | −4.3167E+00 |
| A4 = | −8.5908E−03 | 3.5454E−02 | 1.2690E−01 | −3.3746E−01 | −1.0988E−01 | −6.7837E−02 |
| A6 = | −1.0458E−01 | −2.0406E−01 | −3.4082E−01 | 7.8792E−01 | 5.3628E−02 | 2.5879E−02 |
| A8 = | 2.3576E−01 | 4.5534E−01 | 1.0412E+00 | −1.2429E+00 | −1.4011E−02 | −7.0716E−03 |
| A10 = | −3.1458E−01 | −6.5948E−01 | −2.5039E+00 | 1.2128E+00 | 1.2121E−03 | 1.1966E−03 |
| A12 = | 2.2372E−02 | 4.6423E−01 | 3.3216E+00 | −7.2187E−01 | 3.0964E−04 | −1.1998E−04 |
| A14 = | 3.7973E−01 | −1.0314E−01 | −2.3089E+00 | 2.3533E−01 | −8.0118E−05 | 5.2951E−06 |
| A16 = | −2.4653E−01 | | 6.4598E−01 | −3.1457E−02 | 5.1703E−06 | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.73 | (R11 − R12)/(R11 + R12) | −0.03 |
| Fno | 2.40 | f2/f1 | −0.51 |
| HFOV [deg.] | 37.2 | f/f5 | −0.75 |
| V2 | 55.7 | f/f6 | 0.38 |
| CT6/CT4 | 2.82 | Yc62/TL | 0.36 |
| T23/T34 | 0.20 | SL/TL | 0.90 |
| T56/T45 | 0.30 | TL/EPD | 3.13 |
| (R7 + R8)/(R7 − R8) | −0.01 | TL/ImgH | 1.71 |

7th Embodiment

Figure 13:
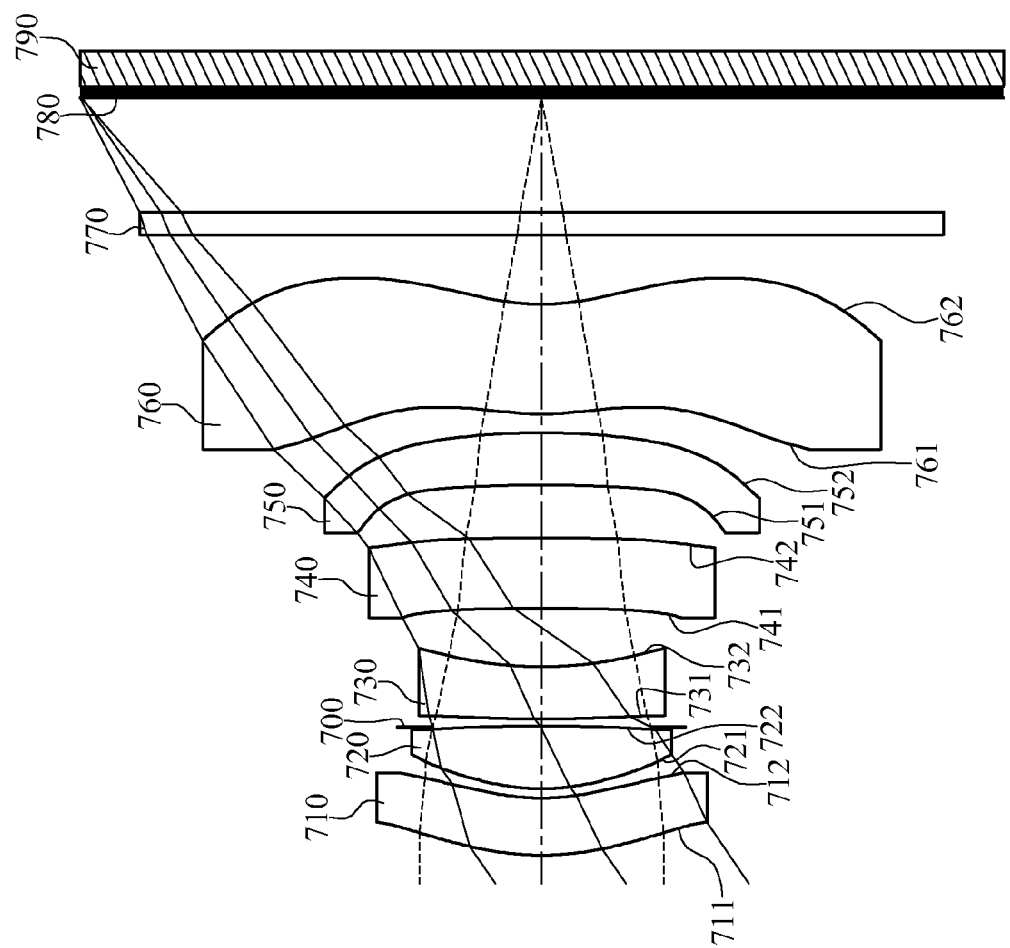
FIG. 13 is a schematic view of an image capturing device according to the 7th embodiment of the present disclosure.
Figure 14:
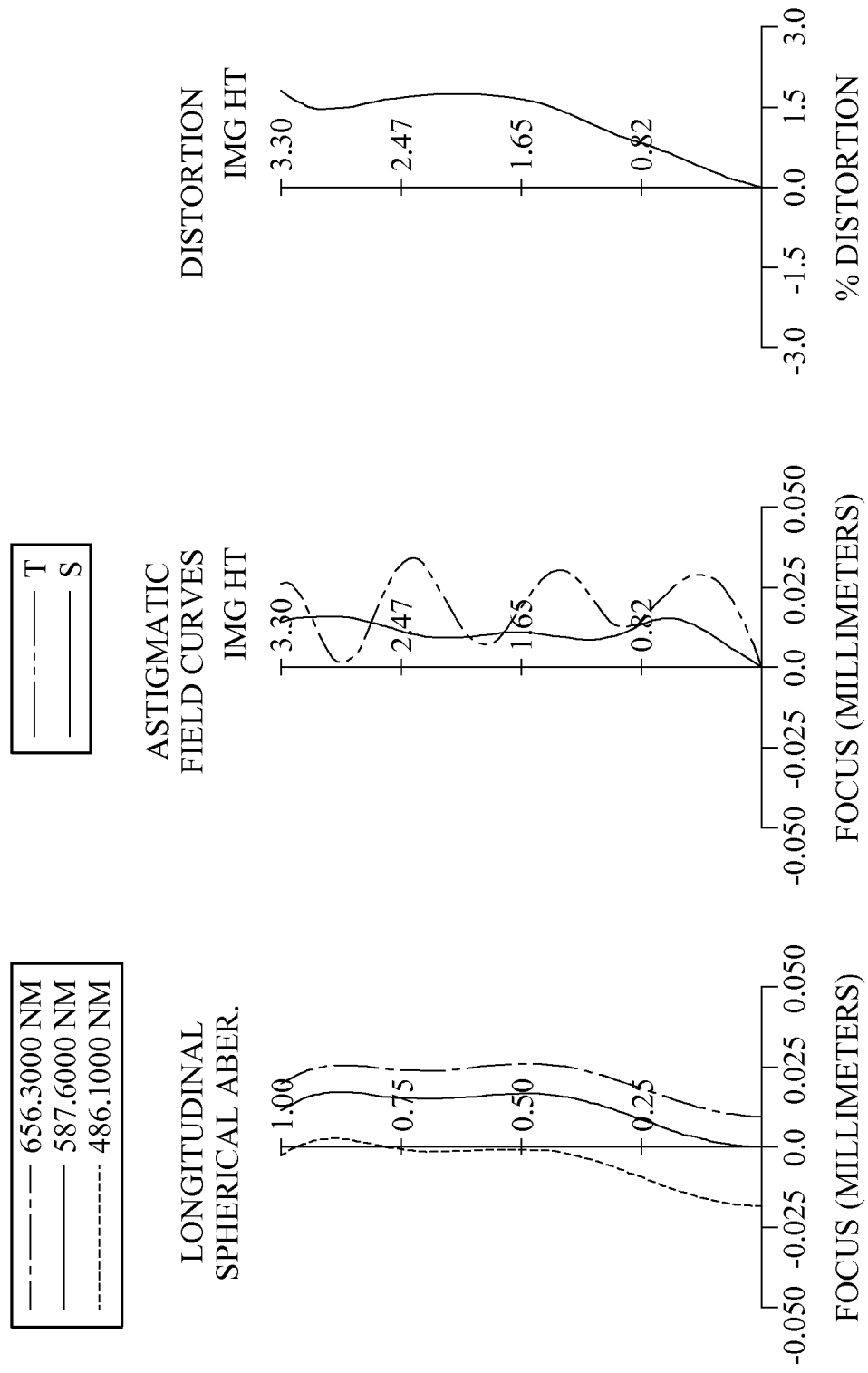
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment.

In FIG. 13, the image capturing device includes the image capturing lens assembly (not otherwise herein labeled) of the present disclosure and an image sensor 790. The image capturing lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image plane 780, wherein the image capturing lens assembly has a total of six lens elements (710-760) with refractive power.

The first lens element 710 with negative refractive power has an object-side surface 711 being convex in a paraxial region thereof and an image-side surface 712 being concave in a paraxial region thereof, which are both aspheric, and the first lens element 710 is made of plastic material.

The second lens element 720 with positive refractive power has an object-side surface 721 being convex in a paraxial region thereof and an image-side surface 722 being convex in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and the third lens element 730 is made of plastic material.

The fourth lens element 740 with negative refractive power has an object-side surface 741 being concave in a paraxial region thereof and an image-side surface 742 being convex in a paraxial region thereof, which are both aspheric, and the fourth lens element 740 is made of plastic material.

The fifth lens element 750 with positive refractive power has an object-side surface 751 being concave in a paraxial region thereof and an image-side surface 752 being convex in a paraxial region thereof, which are both aspheric, and the fifth lens element 750 is made of plastic material.

The sixth lens element 760 with negative refractive power has an object-side surface 761 being convex in a paraxial region thereof and an image-side surface 762 being concave in a paraxial region thereof, which are both aspheric, and the sixth lens element 760 is made of plastic material. Moreover, both of the object-side surface 761 and the image-side surface 762 of the sixth lens element 760 have at least one inflection point.

The IR-cut filter 770 is made of glass and located between the sixth lens element 760 and the image plane 780, and will not affect the focal length of the image capturing lens assembly. The image sensor 790 is disposed on or near the image plane 780 of the image capturing lens assembly.

The detailed optical data of the 7th embodiment are shown in Table 13 and the aspheric surface data are shown in Table 14 below.

TABLE 13

7th Embodiment
f = 4.70 mm, Fno = 2.70, HFOV = 34.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.084 | ASP | 0.411 | Plastic | 1.535 | 55.7 | −25.84 |
| 2 | | 1.686 | ASP | 0.067 | | | | |
| 3 | Lens 2 | 1.592 | ASP | 0.452 | Plastic | 1.544 | 55.9 | 2.69 |
| 4 | | −16.021 | ASP | −0.010 | | | | |
| 5 | Ape. Stop | Plano | | 0.060 | | | | |
| 6 | Lens 3 | 7.759 | ASP | 0.377 | Plastic | 1.639 | 23.5 | −6.97 |
| 7 | | 2.776 | ASP | 0.420 | | | | |
| 8 | Lens 4 | −31.936 | ASP | 0.506 | Plastic | 1.544 | 55.9 | −81.66 |
| 9 | | −114.169 | ASP | 0.384 | | | | |
| 10 | Lens 5 | −6.178 | ASP | 0.374 | Plastic | 1.639 | 23.5 | 108.79 |
| 11 | | −5.808 | ASP | 0.135 | | | | |
| 12 | Lens 6 | 2.093 | ASP | 0.790 | Plastic | 1.535 | 55.7 | −24.55 |
| 13 | | 1.568 | ASP | 0.500 | | | | |
| 14 | IR-cut filter | Plano | | 0.165 | Glass | 1.517 | 64.2 | — |
| 15 | | Plano | | 0.820 | | | | |
| 16 | Image | Plano | | — | | | | |

Note:
Reference wavelength is 587.6 nm (d-line).

TABLE 14

Aspheric Coefficients

| Surface # | | | | | | |
|---|---|---|---|---|---|---|
| | 1 | 2 | 3 | 4 | 6 | 7 |
| k = | −1.1145E+00 | −3.5628E+00 | −2.0635E+00 | 1.0175E+01 | 1.7133E+01 | −1.3180E+01 |
| A4 = | −3.7167E−02 | −8.5356E−02 | −4.2914E−02 | −3.3575E−02 | −7.4024E−02 | 3.7735E−02 |
| A6 = | 8.3642E−03 | −4.2018E−02 | −2.2409E−03 | 8.6693E−02 | 9.3178E−02 | 1.9491E−02 |
| A8 = | −3.3719E−02 | 6.3907E−02 | 3.0791E−02 | −1.7313E−01 | −1.1151E−01 | −1.2417E−01 |
| A10 = | 2.8105E−02 | 1.7479E−02 | 2.3053E−02 | 1.1305E−01 | −8.8224E−02 | 2.5485E−01 |
| A12 = | −8.0420E−03 | −1.3598E−02 | 1.0001E−02 | 7.3364E−02 | 3.4129E−01 | −2.7488E−01 |
| A14 = | −6.1212E−04 | −1.2695E−02 | −8.1027E−03 | −5.5484E−02 | −2.1230E−01 | 1.2231E−01 |

| Surface # | | | | | | |
|---|---|---|---|---|---|---|
| | 8 | 9 | 10 | 11 | 12 | 13 |
| k = | −5.3312E+01 | −1.0765E+01 | −1.9273E+00 | −1.0000E+00 | −2.6866E+01 | −7.5011E+00 |
| A4 = | −4.4613E−02 | −2.8018E−02 | 1.4090E−01 | −8.2960E−02 | −1.4181E−01 | −6.8494E−02 |
| A6 = | −3.3446E−02 | −7.1253E−02 | −3.0997E−01 | 2.2145E−01 | 4.1901E−02 | 1.7058E−02 |
| A8 = | 1.4163E−01 | 1.4059E−01 | 4.3693E−01 | −3.2253E−01 | −4.0994E−03 | −2.7540E−03 |
| A10 = | −1.7925E−01 | −1.3084E−01 | −5.5508E−01 | 2.3357E−01 | −6.5174E−05 | 1.6847E−04 |
| A12 = | 2.0693E−02 | 6.6507E−02 | 4.4014E−01 | −9.3945E−02 | 3.3178E−05 | 3.0197E−06 |
| A14 = | 1.1497E−01 | −1.3704E−02 | −1.8921E−01 | 1.9522E−02 | −1.2589E−06 | −4.4099E−07 |
| A16 = | −7.2897E−02 | | 3.2986E−02 | −1.5741E−03 | −2.2145E−09 | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.70 | (R11 − R12)/(R11 + R12) | 0.14 |
| Fno | 2.70 | f2/f1 | −0.10 |
| HFOV [deg.] | 34.5 | f/f5 | 0.04 |
| V2 | 55.9 | f/f6 | −0.19 |
| CT6/CT4 | 1.56 | Yc62/TL | 0.24 |
| T23/T34 | 0.12 | SL/TL | 0.83 |
| T56/T45 | 0.35 | TL/EPD | 3.13 |
| (R7 + R8)/(R7 − R8) | −1.78 | TL/ImgH | 1.65 |

8th Embodiment

Figure 15:
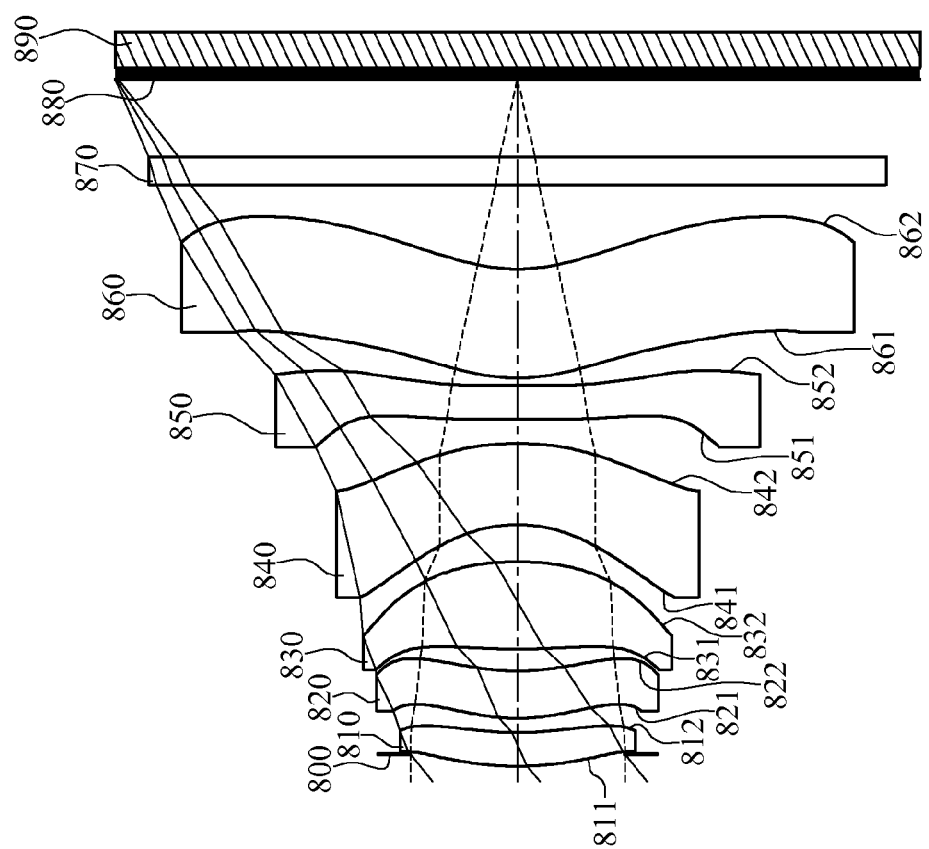
FIG. 15 is a schematic view of an image capturing device according to the 8th embodiment of the present disclosure.
Figure 16:
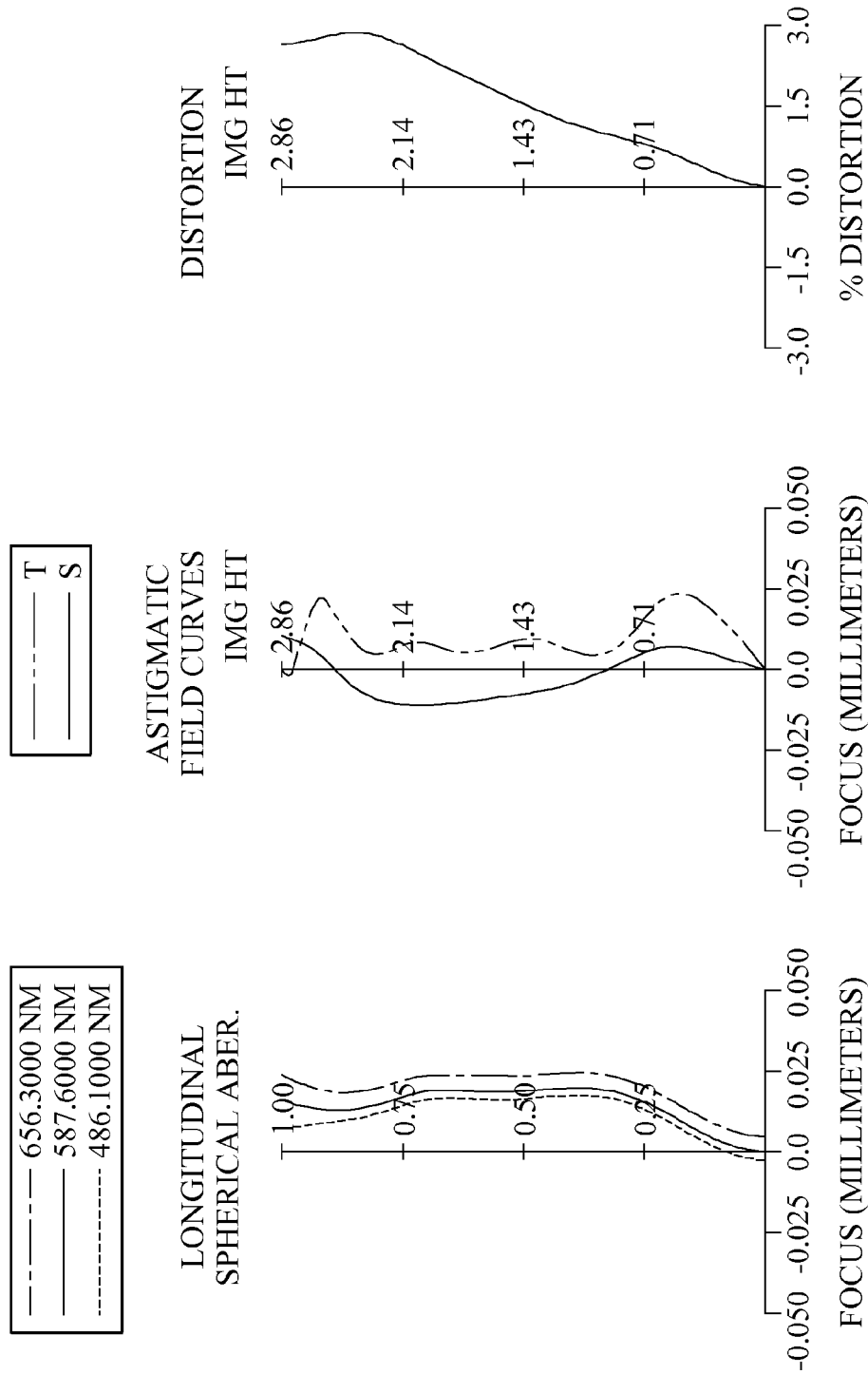
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the image capturing lens assembly (not otherwise herein labeled) of the present disclosure and an image sensor 890. The image capturing lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image plane 880, wherein the image capturing lens assembly has a total of six lens elements (810-860) with refractive power.

The first lens element 810 with negative refractive power has an object-side surface 811 being convex in a paraxial region thereof and an image-side surface 812 being concave in a paraxial region thereof, which are both aspheric, and the first lens element 810 is made of plastic material.

The second lens element 820 with positive refractive power has an object-side surface 821 being convex in a paraxial region thereof and an image-side surface 822 being concave in a paraxial region thereof, which are both aspheric, and the second lens element 820 is made of plastic material.

The third lens element 830 with positive refractive power has an object-side surface 831 being convex in a paraxial region thereof and an image-side surface 832 being convex in a paraxial region thereof, which are both aspheric, and the third lens element 830 is made of plastic material.

The fourth lens element 840 with negative refractive power has an object-side surface 841 being concave in a paraxial region thereof and an image-side surface 842 being convex in a paraxial region thereof, which are both aspheric, and the fourth lens element 840 is made of plastic material.

The fifth lens element 850 with negative refractive power has an object-side surface 851 being concave in a paraxial region thereof and an image-side surface 852 being convex in a paraxial region thereof, which are both aspheric, and the fifth lens element 850 is made of plastic material.

The sixth lens element 860 with positive refractive power has an object-side surface 861 being convex in a paraxial region thereof and an image-side surface 862 being concave in a paraxial region thereof, which are both aspheric, and the sixth lens element 860 is made of plastic material. Moreover, both of the object-side surface 861 and the image-side surface 862 of the sixth lens element 860 have at least one inflection point.

The IR-cut filter 870 is made of glass and located between the sixth lens element 860 and the image plane 880, and will not affect the focal length of the image capturing lens assembly. The image sensor 890 is disposed on or near the image plane 880 of the image capturing lens assembly.

The detailed optical data of the 8th embodiment are shown in Table 15 and the aspheric surface data are shown in Table 16 below.

TABLE 15

8th Embodiment
f = 3.44 mm, Fno = 2.25, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.087 | | | | |
| 2 | Lens 1 | 2.197 | ASP | 0.240 | Plastic | 1.535 | 56.3 | −171.55 |
| 3 | | 2.064 | ASP | 0.101 | | | | |
| 4 | Lens 2 | 1.340 | ASP | 0.338 | Plastic | 1.535 | 56.3 | 8.76 |
| 5 | | 1.713 | ASP | 0.156 | | | | |
| 6 | Lens 3 | 4.521 | ASP | 0.623 | Plastic | 1.544 | 55.9 | 2.58 |
| 7 | | −1.942 | ASP | 0.264 | | | | |
| 8 | Lens 4 | −0.996 | ASP | 0.579 | Plastic | 1.650 | 21.4 | −3.91 |
| 9 | | −2.015 | ASP | 0.176 | | | | |
| 10 | Lens 5 | −15.574 | ASP | 0.240 | Plastic | 1.544 | 55.9 | −95.83 |
| 11 | | −22.326 | ASP | 0.050 | | | | |
| 12 | Lens 6 | 1.292 | ASP | 0.778 | Plastic | 1.535 | 56.3 | 12.20 |
| 13 | | 1.274 | ASP | 0.600 | | | | |
| 14 | IR-cut filter | Plano | | 0.200 | Glass | 1.517 | 64.2 | — |
| 15 | | Plano | | 0.554 | | | | |
| 16 | Image | Plano | | — | | | | |

Note:
Reference wavelength is 587.6 nm (d-line).

TABLE 16

Aspheric Coefficients

| | Surface # | | | | | |
|---|---|---|---|---|---|---|
| | 2 | 3 | 4 | 5 | 6 | 7 |
| k = | −1.8575E+01 | −5.1303E+00 | −4.5364E−01 | 5.6417E−01 | 3.0000E+00 | −1.0473E+00 |
| A4 = | 9.9371E−02 | −4.4448E−01 | −5.3097E−01 | −2.8595E−01 | −1.6789E−01 | −1.5652E−01 |
| A6 = | 1.5215E−02 | 1.0979E+00 | 8.4647E−01 | 3.7353E−02 | −8.8489E−02 | −5.9621E−02 |
| A8 = | −4.8966E−01 | −2.3240E+00 | −1.6581E+00 | 1.8581E−01 | 9.9012E−02 | 1.4702E−01 |
| A10 = | 7.9182E−01 | 2.3304E+00 | 1.6951E+00 | −7.5398E−01 | −6.0571E−02 | −1.2411E−01 |
| A12 = | −6.1282E−01 | −1.1007E+00 | −1.2147E+00 | 6.6732E−01 | −2.1203E−01 | −1.1167E−02 |
| A14 = | | | 3.4122E−01 | −2.2440E−01 | 1.7337E−01 | 4.0901E−02 |

| | Surface # | | | | | |
|---|---|---|---|---|---|---|
| | 8 | 9 | 10 | 11 | 12 | 13 |
| k = | −1.4128E+00 | −2.2081E+00 | 3.0002E+00 | −5.2607E−01 | −3.6812E+00 | −1.4198E+00 |
| A4 = | −9.1222E−02 | −1.6495E−01 | 2.0776E−01 | 2.7687E−01 | −1.1561E−01 | −1.9955E−01 |
| A6 = | 6.9053E−02 | 3.0748E−01 | −2.4506E−01 | −3.6249E−01 | 2.7445E−02 | 1.0624E−01 |
| A8 = | 4.0401E−01 | −2.4096E−01 | 1.2850E−01 | 3.0165E−01 | 1.5008E−02 | −4.3883E−02 |
| A10 = | −8.2890E−01 | 1.0791E−01 | −3.8174E−02 | −1.7269E−01 | −1.0621E−02 | 1.2870E−02 |
| A12 = | 6.1161E−01 | −3.5191E−02 | −5.1522E−03 | 6.0617E−02 | 2.3500E−03 | −2.4187E−03 |
| A14 = | −1.5475E−01 | 8.2714E−03 | 3.9680E−03 | −1.1466E−02 | −1.7812E−04 | 2.5402E−04 |
| A16 = | | | | 8.9190E−04 | −1.2558E−06 | −1.1268E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.44 | (R11 − R12)/(R11 + R12) | 0.01 |
| Fno | 2.25 | f2/f1 | −0.05 |

-continued

| 8th Embodiment | | | |
|---|---|---|---|
| HFOV [deg.] | 38.9 | f/f5 | −0.04 |
| V2 | 56.3 | f/f6 | 0.28 |
| CT6/CT4 | 1.34 | Yc62/TL | 0.37 |
| T23/T34 | 0.59 | SL/TL | 0.98 |
| T56/T45 | 0.28 | TL/EPD | 3.21 |
| (R7 + R8)/(R7 − R8) | −2.96 | TL/ImgH | 1.72 |

9th Embodiment

Figure 17:
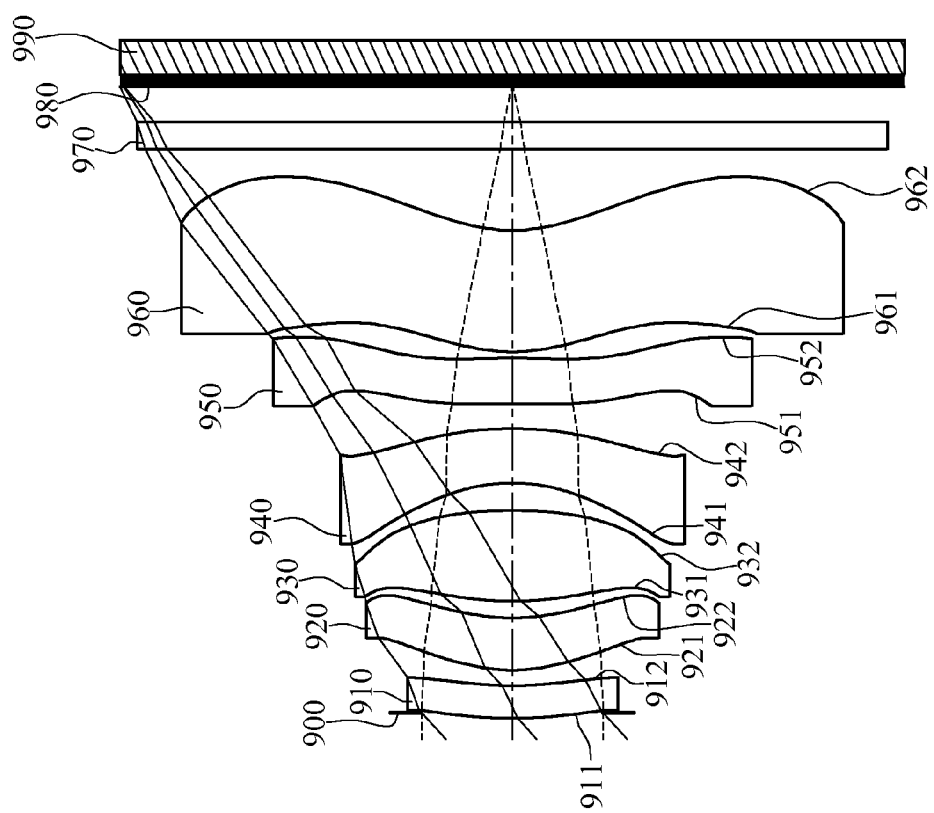
FIG. 17 is a schematic view of an image capturing device according to the 9th embodiment of the present disclosure.
Figure 18:
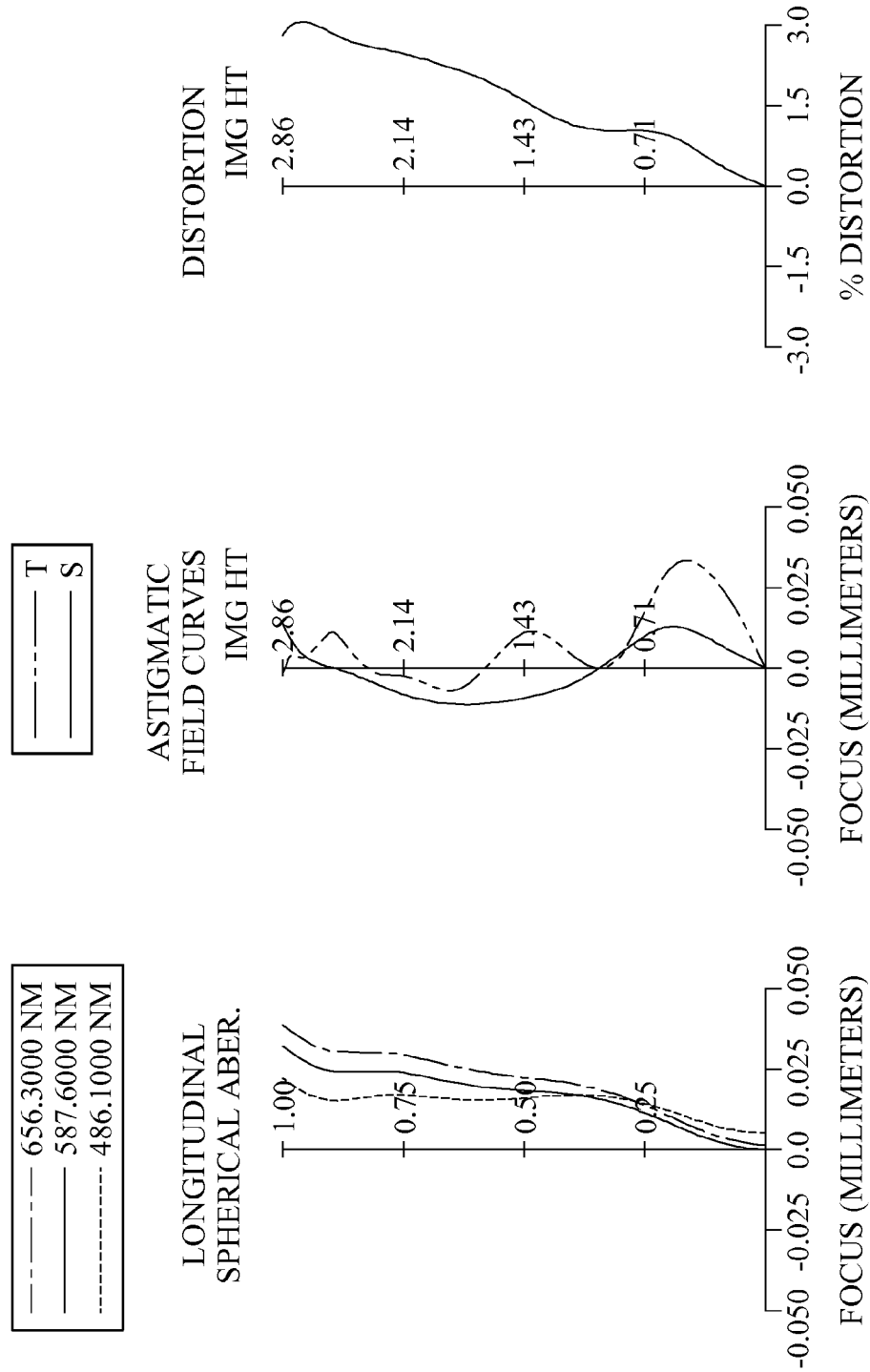
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the image capturing lens assembly (not otherwise herein labeled) of the present disclosure and an image sensor 990. The image capturing lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image plane 980, wherein the image capturing lens assembly has a total of six lens elements (910-960) with refractive power.

The first lens element 910 with negative refractive power has an object-side 911 surface being convex in a paraxial region thereof and an image-side surface 912 being concave in a paraxial region thereof, which are both aspheric, and the first lens element 910 is made of plastic material.

The second lens element 920 with positive refractive power has an object-side surface 921 being convex in a paraxial region thereof and an image-side surface 922 being concave in a paraxial region thereof, which are both aspheric, and the second lens element 920 is made of plastic material.

The third lens element 930 with positive refractive power has an object-side surface 931 being convex in a paraxial region thereof and an image-side surface 932 being convex in a paraxial region thereof, which are both aspheric, and the third lens element 930 is made of plastic material.

The fourth lens element 940 with negative refractive power has an object-side surface 941 being concave in a paraxial region thereof and an image-side surface 942 being convex in a paraxial region thereof, which are both aspheric, and the fourth lens element 940 is made of plastic material.

The fifth lens element 950 with positive refractive power has an object-side surface 951 being concave in a paraxial region thereof and an image-side surface 952 being convex in a paraxial region thereof, which are both aspheric, and the fifth lens element 950 is made of plastic material.

The sixth lens element 960 with positive refractive power has an object-side surface 961 being convex in a paraxial region thereof and an image-side surface 962 being concave in a paraxial region thereof, which are both aspheric, and the sixth lens element 960 is made of plastic material. Moreover, both of the object-side surface 961 and the image-side surface 962 of the sixth lens element 960 have at least one inflection point.

The IR-cut filter 970 is made of glass and located between the sixth lens element 960 and the image plane 980, and will not affect the focal length of the image capturing lens assembly. The image sensor 990 is disposed on the image plane 980 of the image capturing lens assembly.

The detailed optical data of the 9th embodiment are shown in Table 17 and the aspheric surface data are shown in Table 18 below.

TABLE 17

9th Embodiment
f = 3.06 mm, Fno = 2.30, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.040 | | | | |
| 2 | Lens 1 | 3.139 | ASP | 0.240 | Plastic | 1.650 | 21.4 | −19.34 |
| 3 | | 2.436 | ASP | 0.114 | | | | |
| 4 | Lens 2 | 1.271 | ASP | 0.384 | Plastic | 1.530 | 55.8 | 8.77 |
| 5 | | 1.567 | ASP | 0.123 | | | | |
| 6 | Lens 3 | 2.308 | ASP | 0.667 | Plastic | 1.544 | 55.9 | 2.53 |
| 7 | | −3.069 | ASP | 0.202 | | | | |
| 8 | Lens 4 | −1.266 | ASP | 0.400 | Plastic | 1.650 | 21.4 | −3.93 |
| 9 | | −2.824 | ASP | 0.183 | | | | |
| 10 | Lens 5 | −11.571 | ASP | 0.336 | Plastic | 1.544 | 55.9 | 16.83 |
| 11 | | −5.165 | ASP | 0.046 | | | | |
| 12 | Lens 6 | 1.353 | ASP | 0.893 | Plastic | 1.535 | 56.3 | 19.32 |
| 13 | | 1.198 | ASP | 0.600 | | | | |
| 14 | IR-cut filter | Plano | | 0.200 | Glass | 1.517 | 64.2 | — |
| 15 | | Plano | | 0.260 | | | | |
| 16 | Image | Plano | | — | | | | |

Note:
Reference wavelength is 587.6 nm (d-line).

TABLE 18

Aspheric Coefficients

| | Surface # | | | | | |
|---|---|---|---|---|---|---|
| | 2 | 3 | 4 | 5 | 6 | 7 |
| k = | −4.8065E+01 | 9.0894E−01 | 3.5877E−02 | 9.0263E−01 | 2.3933E+00 | −9.9998E+00 |
| A4 = | 7.0153E−02 | −3.7741E−01 | −4.1871E−01 | −2.6107E−01 | −1.4488E−01 | −7.1397E−02 |
| A6 = | −8.2562E−03 | 9.6928E−01 | 8.4618E−01 | 1.1096E−01 | −4.6178E−02 | −7.7573E−02 |
| A8 = | −4.3612E−01 | −2.2098E+00 | −1.6252E+00 | 2.1091E−01 | 1.3007E−01 | 1.2838E−01 |
| A10 = | 8.5472E−01 | 2.6147E+00 | 1.7756E+00 | −7.6661E−01 | −3.5857E−02 | −1.3110E−01 |
| A12 = | −5.8773E−01 | −1.2616E+00 | −1.1050E+00 | 6.4258E−01 | −2.1688E−01 | −9.5546E−03 |
| A14 = | | | 2.7489E−01 | −2.1860E−01 | 1.1916E−01 | 3.8788E−02 |

TABLE 18-continued

Aspheric Coefficients

| Surface # | | | | | |
|---|---|---|---|---|---|
| 8 | 9 | 10 | 11 | 12 | 13 |
| k = −2.1754E+00 | −6.9654E+00 | 2.9283E+00 | −6.5975E+00 | −2.1816E+00 | −1.4122E+00 |
| A4 = −7.4036E−02 | −1.5896E−01 | 3.1280E−01 | 3.7231E−01 | −1.5105E−01 | −1.9639E−01 |
| A6 = 5.1894E−02 | 2.9655E−01 | −2.9545E−01 | −3.8980E−01 | 2.0192E−02 | 1.0473E−01 |
| A8 = 3.8089E−01 | −2.4334E−01 | 1.4464E−01 | 2.9985E−01 | 1.4701E−02 | −4.4293E−02 |
| A10 = −8.4732E−01 | 1.1172E−01 | −3.5169E−02 | −1.7164E−01 | −1.0079E−02 | 1.2888E−02 |
| A12 = 6.1184E−01 | −3.2955E−02 | −6.3347E−03 | 6.0813E−02 | 2.6680E−03 | −2.3993E−03 |
| A14 = −1.4223E−01 | 7.6813E−03 | 3.3718E−03 | −1.1469E−02 | −1.2767E−04 | 2.5391E−04 |
| A16 = | | | 8.7537E−04 | −3.8629E−05 | −1.1530E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.06 | (R11 − R12)/(R11 + R12) | 0.06 |
| Fno | 2.30 | f2/f1 | −0.45 |
| HFOV [deg.] | 42.0 | f/f5 | 0.18 |
| V2 | 55.8 | f/f6 | 0.16 |
| CT6/CT4 | 2.23 | Yc62/TL | 0.36 |
| T23/T34 | 0.61 | SL/TL | 0.99 |
| T56/T45 | 0.25 | TL/EPD | 3.49 |
| (R7 + R8)/(R7 − R8) | −2.62 | TL/ImgH | 1.63 |

The foregoing image capturing device 10 may be installed in but not limited to a mobile terminal, including a smart phone (FIG. 20), a tablet personal computer (FIG. 21) or a wearable device (FIG. 22). Since the present disclosure of the first lens element has negative refractive power, it is favorable for enlarging the field of view so as to capture more of the image scene for the mobile terminal. Moreover, the second lens element has the major light convergence ability; it is favorable for effectively reducing the back focal length of the image capturing lens assembly so as to reduce the total track length thereof. In addition, it is also favorable for avoiding the refractive powers in the rear of image capturing lens assembly from excessively strong resulting in excessive aberration and worse image quality.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising, in order from an object side to an image side:
    a first lens element with negative refractive power having an object-side surface being convex in a paraxial region thereof and an image-side surface being concave in a paraxial region thereof;
    a second lens element having positive refractive power;
    a third lens element having refractive power;
    a fourth lens element having refractive power;
    a fifth lens element having negative refractive power, wherein an object-side surface and an image-side surface of the fifth lens element are aspheric; and
    a sixth lens element with refractive power having an image-side surface being concave in a paraxial region thereof, wherein both of an object-side surface and the image-side surface of the sixth lens element are aspheric, and at least one of the object-side surface and the image-side surface of the sixth lens element has at least one inflection point;
    wherein the image capturing lens assembly has a total of six lens elements with refractive power, a focal length of the image capturing lens assembly is f, a focal length of the first lens element is f1, a focal length of the second lens element is f2, a focal length of the fifth lens element is f5, and the following conditions are satisfied:

$$-1.0 < f2/f1 < 0; \text{ and}$$

$$-1.5 < f/f5 < 0.$$

2. The image capturing lens assembly of claim 1, further comprising:
    a stop, wherein an axial distance between the stop and an image plane is SL, and an axial distance between the object-side surface of the first lens element and the image plane is TL, the following condition is satisfied:

$$0.80 < SL/TL < 1.10.$$

3. The image capturing lens assembly of claim 1, wherein an axial distance between the object-side surface of the first lens element and an image plane is TL, a maximum image height of the image capturing lens assembly is ImgH, and the following condition is satisfied:

$$TL/ImgH < 1.90.$$

4. The image capturing lens assembly of claim 1, wherein of the first lens element, the second lens element, the third lens element, the fourth lens element, the fifth lens element and the sixth lens element of the image capturing lens assembly, there is a space in a paraxial region between every pair of lens elements that are adjacent to each other.

5. The image capturing lens assembly of claim 1, wherein the second lens element has an object-side surface being convex in a paraxial region thereof.

6. The image capturing lens assembly of claim 5, wherein the focal length of the first lens element is f1, the focal length of the second lens element is f2, and the following condition is satisfied:

$-0.6 < f2/f1 < 0.$

7. The image capturing lens assembly of claim 5, wherein the object-side surface of the fifth lens element is concave in a paraxial region thereof.

8. The image capturing lens assembly of claim 5, wherein the focal length of the image capturing lens assembly is f, the focal length of the fifth lens element is f5, and the following condition is satisfied:

$-0.85 < f/f5 < 0.$

9. The image capturing lens assembly of claim 2, wherein the third lens element has negative refractive power.

10. The image capturing lens assembly of claim 1, wherein the object-side surface of the sixth lens element is convex in a paraxial region thereof.

11. The image capturing lens assembly of claim 10, wherein the focal length of the image capturing lens assembly is f, a focal length of the sixth lens element is f6, and the following condition is satisfied:

$-0.5 < f/f6 < 0.5.$

12. The image capturing lens assembly of claim 10 wherein a central thickness of the fourth lens element is CT4, a central thickness of the sixth lens element is CT6, and the following condition is satisfied:

$1.0 < CT6/CT4 < 4.0.$

13. The image capturing lens assembly of claim 8, wherein the fourth lens element has positive refractive power.

14. The image capturing lens assembly of claim 10, wherein the third lens element has an image-side surface being concave in a paraxial region thereof.

15. An image capturing lens assembly comprising, in order from an object side to an image side:
a first lens element having negative refractive power;
a second lens element having positive refractive power;
a third lens element having refractive power;
a fourth lens element having refractive power, wherein an object-side surface and an image-side surface of the fourth lens element are aspheric;
a fifth lens element having refractive power, wherein an object-side surface and an image-side surface of the fifth lens element are aspheric; and
a sixth lens element with refractive power having an image-side surface being concave in a paraxial region thereof, wherein both of an object-side surface and the image-side surface of the sixth lens element are aspheric, and at least one of the object-side surface and the image-side surface of the sixth lens element has at least one inflection point;
wherein the image capturing lens assembly has a total of six lens elements with refractive power, a focal length of the image capturing lens assembly is f, a focal length of the first lens element is f1, a focal length of the second lens element is f2, a focal length of the fifth lens element is f5, and an axial distance between an object-side surface of the first lens element and an image plane is TL, an entrance pupil diameter of the image capturing lens assembly is EPD, and the following conditions are satisfied:

$-3.0 < f2/f1 < 0;$ $-1.5 < f/f5 < 0.4;$ and $TL/EPD < 4.0.$

16. The image capturing lens assembly of claim 15, wherein a curvature radius of the object-side surface of the sixth lens element is R11, a curvature radius of the image-side surface of the sixth lens element is R12, and the following condition is satisfied:

$-0.2 < (R11-R12)/(R11+R12) < 0.4.$

17. The image capturing lens assembly of claim 15, wherein a vertical distance between a non-axial critical point on the image-side surface of the sixth lens element and an optical axis is Yc62, the axial distance between the object-side surface of the first lens element and the image plane is TL, and the following condition is satisfied:

$0.1 < Yc62/TL < 0.7.$

18. The image capturing lens assembly of claim 15, wherein the focal length of the first lens element is f1, the focal length of the second lens element is f2, and the following condition is satisfied:

$-1.0 < f2/f1 < 0.$

19. The image capturing lens assembly of claim 18, wherein an axial distance between the fourth lens element and the fifth lens element is T45, an axial distance between the fifth lens element and the sixth lens element is T56, and the following condition is satisfied:

$0 < T56/T45 < 0.90.$

20. An image capturing device, comprising:
the image capturing lens assembly of claim 15; and
an image sensor, wherein the image sensor is located on an image side of the image capturing lens assembly.

21. A mobile terminal, comprising:
the image capturing device of claim 20.

22. The image capturing lens assembly of claim 15, wherein the first lens element has an object-side surface being convex in a paraxial region thereof and an image-side surface being concave in a paraxial region thereof.

23. The image capturing lens assembly of claim 22, wherein an Abbe number of the second lens element is V2, and the following condition is satisfied:

$40 < V2 < 70.$

24. The image capturing lens assembly of claim 22, wherein an axial distance between the second lens element and the third lens element is T23, an axial distance between the third lens element and the fourth lens element is T34, and the following condition is satisfied:

$0 < T23/T34 < 0.50.$

25. The image capturing lens assembly of claim 22, wherein a curvature radius of an object-side surface of the fourth lens element is R7, a curvature radius of an image-side surface of the fourth lens element is R8, and the following condition is satisfied:

$-0.5 < (R7+R8)/(R7-R8) < 0.5.$

* * * * *

UNITED STATES PATENT AND TRADEMARK OFFICE
CERTIFICATE OF CORRECTION

PATENT NO. : 9,201,216 B2
APPLICATION NO. : 14/222267
DATED : December 1, 2015
INVENTOR(S) : Hsin-Hsuan Huang et al.

Page 1 of 1

It is certified that error appears in the above-identified patent and that said Letters Patent is hereby corrected as shown below:

Claims

On Column 35, claim 9, line 1: replace "claim 2" with --claim 5--

On Column 35, claim 13, line 1: replace "claim 8" with --claim 10--

Signed and Sealed this
Fifteenth Day of March, 2016

Michelle K. Lee
*Director of the United States Patent and Trademark Office*